United States Patent [19]

Cutler

[11] 3,979,653

[45] Sept. 7, 1976

[54] VELOCITY-CHANGE CONTROL SYSTEM AND METHOD FOR NUMERICAL CONTROL MACHINES

[76] Inventor: Hymie Cutler, 16230 Santa Rosa, Detroit, Mich. 48221

[22] Filed: Sept. 27, 1973

[21] Appl. No.: 401,293

[52] U.S. Cl. .............................. 318/571; 318/603; 318/621
[51] Int. Cl.² ....................................... G05B 19/24
[58] Field of Search ........... 318/571, 573, 603, 610, 318/618, 621, 611

[56] References Cited
UNITED STATES PATENTS

| | | | |
|---|---|---|---|
| 2,954,514 | 9/1960 | Hemstreet | 318/611 |
| 3,539,897 | 11/1970 | Sommeria | 318/618 |
| 3,668,500 | 6/1972 | Kosem | 318/603 X |
| 3,781,626 | 12/1973 | Kubo et al. | 318/561 |
| 3,790,764 | 2/1974 | Rouxel et al. | 318/621 X |
| 3,792,333 | 2/1974 | Cutler | 318/571 |

*Primary Examiner*—B. Dobeck
*Attorney, Agent, or Firm*—Benjamin J. Barish

[57] ABSTRACT

A velocity-change control system and method are described for numerical control machines enabling the programming of higher speeds of operation for curved and straight-line paths while reducing positional errors and maintaining the acceleration and deceleration at a prescribed value. The system includes a hardwired digital logic unit for each axis interposed between the axis path generator and the axis drive. The input to each axis unit corresponds to the programmed path and velocity and is in the form of electrical pulses each representing a small fixed increment of motion for the particular axis. The output is in the form of pulses representing the same resolution of motion as the input pulses but providing an output trace which lags the input trace by a distance related to the path velocity. This lag distance is continuously stored in the control system, and is used to smooth out velocity step inputs so the outputs will be smooth accelerations and decelerations at rates which may be prescribed to be well within the axes drive response capabilities or the drive train stress limits required for reasonable mechanical wear rates.

19 Claims, 8 Drawing Figures

VELOCITY-CHANGE CONTROL SYSTEM AND METHOD FOR NUMERICAL CONTROL MACHINES

BACKGROUND OF THE INVENTION

The present invention relates to a method and apparatus for controlling the movement of a movable member in accordance with programmed path and velocity, and particularly to a method and apparatus for use in a numerical control contouring machine enabling the programming of higher speeds of operation for curved and straight-line paths while reducing positional errors and maintaining the acceleration and deceleration at a prescribed value.

Several systems are presently in use to control velocity changes in numerical control contouring machines.

One system uses a high-gain positioning servo for each axis and controls its axis drive in a manner tending to keep at zero the difference between the commanded position and the actual position of the axis. While that difference (called the servo-following-error) will be quite small, it will not be zero but will vary with the velocity. A common value for such servo is 0.001 inch following-error per 100 IPM axis velocity. If an axis controlled by such a servo is moving at 100 IPM when the part program reaches a corner and says stop, there will only be 0.001 inch of programmed motion left to decelerate and stop. The inertia of the system will not allow this, and the axis will overshoot and then come back. That overshoot may cause damaging mechanical shocks or gouging of the workpiece. To avoid such difficulties with a high-gain servo, it is necessary to program the speed increases or slow-downs gradually, in a series of small steps. Such calculations can make it necessary to utilize an off-line computer to prepare the part-programs for even the most simple pattern of motions.

Another system, called the low-gain type of servo, which operates with a large servo-following error, has become popular to avoid the overshoot and the program difficulties caused by the necessity of making all speed changes in small steps. In the low-gain servo system, the servo-following error is commonly 0.001 inch for a range from 0.5 to 3 IPM axis velocity. For example, if the calibration of such a system is 0.5 IPM per mill (0.001 inch) then at a velocity of 400 IPM the actual axis position will lag the commanded position by 0.800 inches. That is a sufficient distance so that if the commanded velocity abruptly decreases to zero, the axis can slow down without overshooting the commanded position. Programming becomes much simpler since the motions do not have to be broken up into a number of accelerations and deceleration steps.

However, the above low-gain system has a number of disadvantages as compared to the high-gain system.

Thus, the low-gain system requires the use of a very precise tachometer to produce the feedback signal representing the actual velocity. It also requires a very high degree of linearity, and moreover, each axis must be closely matched with the others as to servo gains. Insofar as these conditions are not realised, the actual straight paths will deviate from the prescribed. Further, the circuits and signals involved are analog and will suffer from some degree of drift due to temperature variations and component aging, and these errors will be greater for higher velocities. This is to be contrasted with high-gain small following-error systems, wherein even a substantial mismatch between the axes can only cause a very small path inaccuracy. The path deviation will be a portion of the servo following-error. For the high-gain servo, the following-error can be as low as one-hundredth that of the low-gain type, and accordingly its deviation from the described path will also be much less.

Further, in the low-gain following-error system, the path deviation, caused by the commanded-path being curved or of changing direction, is greater for larger following-errors or for tighter curves. The explanation for this particular inexactness is that the servo produces a motion vector that is a straight line directed along the servo following-error. The direction of the vector will not recognise any curvature that may have existed between the current actual position and the commanded position. With a low-gain type servo, that path deviation can be reduced either by slower speeds, or in the case of a corner, by providing a dwell.

BRIEF SUMMARY OF THE INVENTION

A broad object of the present invention is to provide a novel apparatus and method having advantages in the above respects for moving a movable member in accordance with a programmed path and velocity.

A more particular object of the invention is to provide an inexpensive means of improving the performance of numerically controlled machines so that contouring velocities may be considerably increased without a sacrifice of path accuracy while keeping the acclerations and declerations within prescribed bounds and allowing simplified part programming.

According to a broad aspect of the invention, the foregoing are accomplished by an apparatus and a method in which there is first digitally generated a series of program electrical pulses to represent an input trace corresponding to the programmed path and velocity of movement of the movable member, and then digitally generating from the program pulses, a series of command electrical pulses to represent a second trace corresponding to the path and velocity of the input trace but lagging the input trace by a lag which varies with the programmed path velocity. The so-produced command electrical pulses are used for controlling the movement of the movable member.

In the embodiment of the invention described below, there are a plurality of axes of movement of the movable member, both series (i.e. the program series and the command series) being in the form of axis-pulses for each axis of movement of the movable member. Each axis-pulse represents a small fixed increment of movement of the movable member for the respective axis, the rate of generation of the pulses for each axis, and the co-ordination of the pulses between the different axes, representing a resultant path and velocity of movement of the movable member.

The command-pulse generating means comprises a lag storage system for each axis receiving the program axis-pulses of the respective axes and storing a value corresponding to the programmed movement velocity. The lag storge system further includes means effective upon an increase or decrease in the programmed movement velocity for effecting a corresponding increase or decrease, but at a slower rate, of the produced command axis-pulses, whereby the stored lag value changes and the acclerations and the decelerations are smoothed out.

More particularly, the lag storage system comprises, for each axis, a data register accumulating the program-generated axis-pulses for the respective axis, an error register, incrementing means periodically incrementing the error register in one direction by the amount in the data register and producing a command axis-pulse each time the error register is of one sign, and further incrementing means effective upon the generation of each command axis-pulse to increment the error register in the opposite direction by a predetermined quantity corresponding to the desired acceleration and deceleration characteristics of the system. A change in the sign in the error register (e.g. changing from positive to zero or to negative) terminates the generation of the command axis-pulses until a subsequent incrementing thereof by the amount in the data register changes it back (e.g. back to positive). The command axis-pulses so produced are utilized by the drive control means for controlling the movement of the movable member.

According to a still further feature, the lag storage means for each axis is divided into a plurality of stages or cells each corresponding to a predetermined fraction or segment of the lag between the program-generated axis-pulses and the command axis-pulses for each axis. Each stage includes a data register and an error register, as mentioned above, for the respective lag segment. The command axis-pulses outputted from each stage are inputted into the succeeding stage, and the command axis-pulses outputted from the last stage are utilized for controlling the movement of the movable member.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
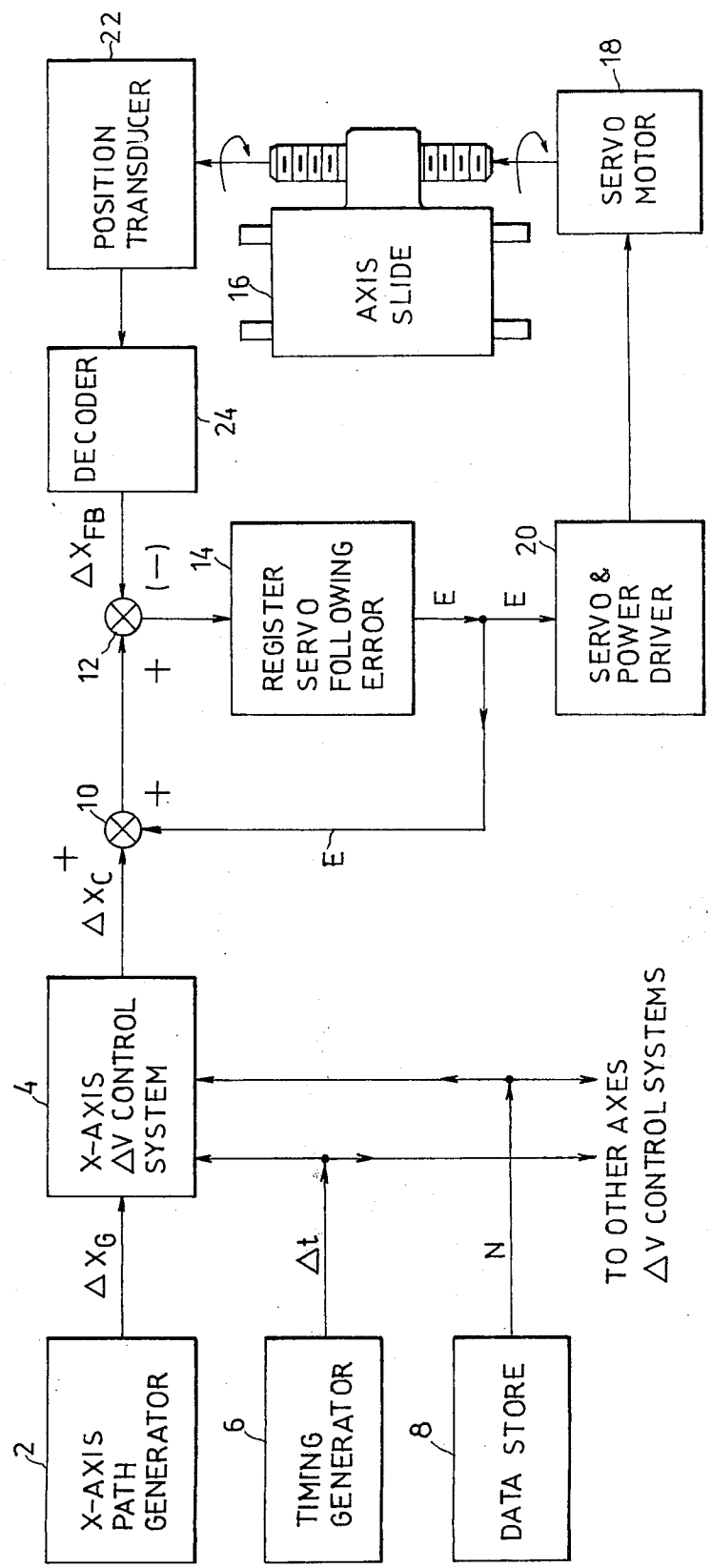
FIG. 1 is a block diagram of one form of velocity-change control system for numerical control contouring machines constructed in accordance with the invention.

FIG. 1 broadly illustrates one drive axis, namely the X-axis, of a numerical control contouring machine system in accordance with the present invention. Thus, there is included an axis path generator 2 which generates a series of electrical digital pulses ($\Delta X_G$) corresponding to the progammed path and velocity of movement for that particular axis. These pulses are inputted to the novel velocity-change control system, generally designated 4, which produces the command axis-pulses ($\Delta X_C$) used for controlling the drive for that axis. The velocity-change control system 4 also receives timing pulses ($\Delta t$) from a timing generator 6 operating at a fixed frequency. Further, the velocity-change control system 4 receives a constant quantity (N) from a data store 8, this quantity defining the desired velocity characteristics of the system, and being identical for all axes of the drive.

Figure 2:
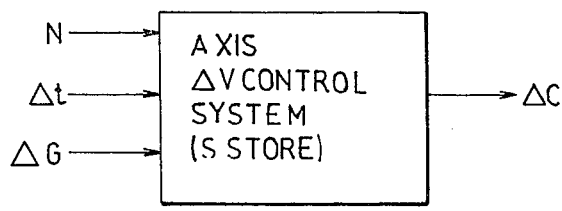
FIG. 2 is a diagram illustrating the inputs and outputs of the main control unit for each axis.

The velocity-change control system 4 for the respective axis receives the foregoing inputs (see FIG. 2), produces and stores a "lag" quantity (S) which varies with the programmed velocity but changes at a slower rate than the programmed changes in the velocity, and produces output command pulses $\Delta X_C$ which are used for actually controlling the motor drive for that particular axis. In other words, instead of using the program-generated axis-pulses ($\Delta X_G$ for the X-axis) for controlling the motor drives, the drives are controlled by the command axis-pulses ($\Delta X_C$ for the X-axis) produced by the novel velocity-change system 4, which command axis-pulses represent a trace incorporating a lag over the trace represented by the program-generated pulses, and which lag changes with changes in the program path velocity but at a slower rate. In this manner, rapid accelerations and decelerations are automatically smoothed out, thereby enabling the programming of quickly-changing contouring velocities with a minimum sacrifice of path accuracy.

The drive control system utilizing the produced command axis-pulses ($\Delta X_C$) may be of the conventional type and would preferably use the high-gain, low following-error servo. This combination provides the advantages mentioned above, namely ease of programming and accuracy in producing contours, while at the same time keeping the acceleration and deceleration within prescribed bounds to limit overshoot. The drive control system may also be of the open-loop stepper motor type and would also realize these advantages.

Thus, as shown in FIG. 1, the produced command axis-pulses ($\Delta X_C$) are fed via summing points 10 and 12 to a register 14 for the servo following-error, which as indicated above may be of the high-gain, low following-error type. Register 14 also receives pulses representing the actual position of the X-axis slide 16 as positioned by servo motor 18 controlled by servo and power drives 20. The actual position of the slide is detected by position transducer 22 which feeds the actual position information to register 14 via decoder 24 and summing point 12. The latter summing point substracts the feed-back pulses ($\Delta X_{FB}$) designating the actual axis position of the slide, from the command axis-pulses ($\Delta X_C$) designating the commanded position, and this error (E) is fed both to the servo driver 20 for controlling the servo motor 18, and also to summing point 10 where it is added to the command axis-pulses ($\Delta X_C$).

It will be appreciated that the system illustrated in FIG. 1, except for the velocity-change control unit 4, is quite conventional in numerical control machines, and therefore further details are not deemed necessary. It will also be appreciated that, as shown in FIG. 1 (also FIG. 5), there is a velocity-change control unit 4 for each drive-axis, each being supplied by the program-generated axis-pulses (e.g. $\Delta X_G$) from its respective path generator 2. Timing generator 6 supplying the timing pulses $\Delta t$, and data store 8 supplying the constant quantity N representing the desired velocity response characteristics of the system, are common to the velocity-change control units for all the axes.

Before proceeding with a detailed description of the velocity-change control unit 4, it will first be helpful to observe the behaviour of the movable member both when a straight-line steady-state path and when a curved path are programmed. These paths are illustrated in FIGS. 3 and 4, respectively.

Figure 3:
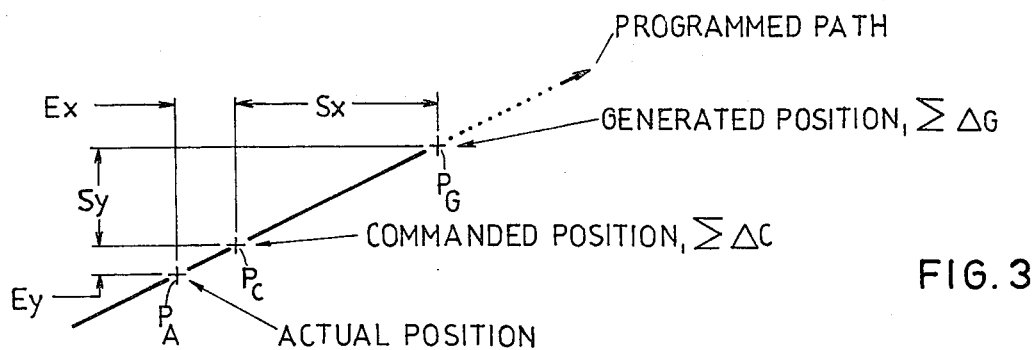
FIG. 3 is a diagram illustrating the straight line path behaviour at steady-state, particularly the program-generated position, the commanded position produced by the control system, and the actual position of the movable member.
Figure 4:
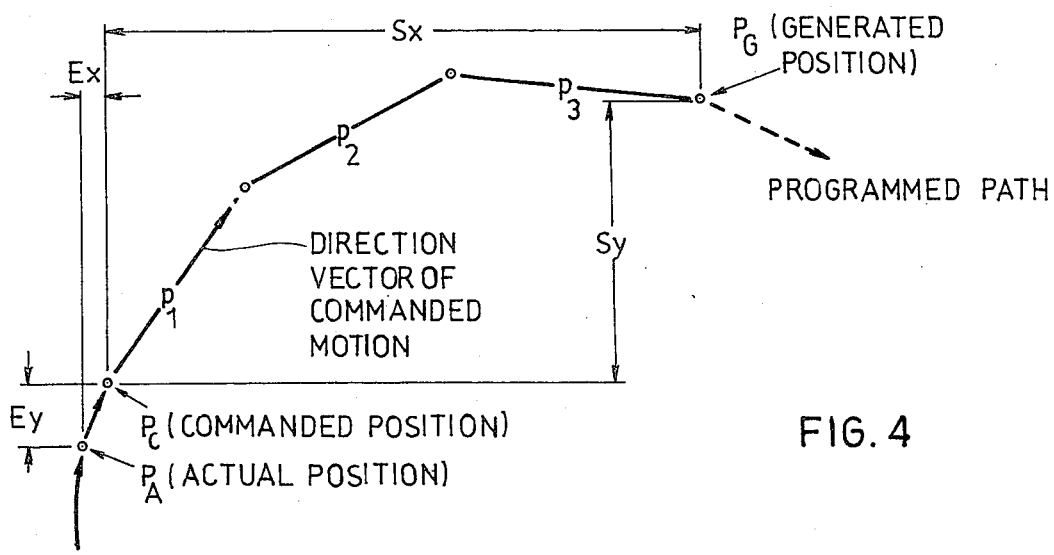
FIG. 4 is a similar diagram illustrating the curve path behaviour of the movable member.

Thus, as shown in FIG. 3 illustrating the straight-line path behaviour at a steady-state, point $P_G$ represents the generated position of the programmed path, point $P_C$ represents the commanded position, and point $P_A$ represents the actual position. The distance between points $P_G$ and $P_C$ represents the lag S, and the distance between points $P_C$ and $P_A$ represents the servo-following-error E. The X-axis and Y-axis components of the lag are designated $S_x$ and $S_y$ respectively; and similarly, the X-axis and Y-axis components of the servo-following-error are designated $E_x$ and $E_y$ respectively.

Since the system described is a digital one, with each pulse representing a small increment of motion, it wil be seen that the X-axis component of the program-generated position $P_G$ will correspond to the sum of all the X-axis-pulses $\Delta G$ x, and the Y-axis component of position $P_G$ will correspond to the sum of all the Y-axis-pulses $\Delta G$ y; thus, the generated position $P_G$ corresponds to $\Sigma \Delta G$.

In a similar manner, the commanded position $P_C$ corresponds to the position determined by the sum of all the command axis-pulses in the X-axis ($\Delta C_x$) and the sum of the command axis-pulses in the Y-axis ($\Delta C_Y$), or $\Sigma \Delta C$.

The distance S by which the commanded position $P_C$ lags the generated position $P_G$ can thus be determined, for each axis, by accumulating the pulses supplied by the axis path generator (2) for the respective axis, and subtracting therefrom the sum of the pulses outputted to the respective axis drives. Stated otherwise:

axis S = $\Sigma$axis $\Delta G$ $-\Sigma$axis $\Delta C$       (1)

For a steady-state straight-line motion, the lag S per axis is precisely proportional to the respective axis velocity. The result is that the output path is precisely on the generated straight-line path illustrated in FIG. 3. Since the velocity-control unit 4 which produces the command axis-pulses is completely digital, the gain factor match of the axes will be perfect without any calibrations irrespective of how great a value of lag S is used.

The real importance of the velocity-change control unit 4 lies in its behaviour for curved paths illustrated in FIG. 4. As briefly mentioned earlier and as to be described more fully below, each control unit 4 is divided into a plurality of stages or cells each corresponding to a predetermined fraction or segment of the lag S between the programmed position $P_G$ and the commanded position $P_C$. FIG. 4 illustrates, for purposes of example, a 3-cell system in which the lag is divided into three fractions or segments, namely segments p1, p2 and p3. By thus dividing the lag S into a plurality of small segments, the position error during the tracing of a curved path is much less than in the case of the conventional large following-error servo system, and therefore provides greater path accuracy.

Figure 5:
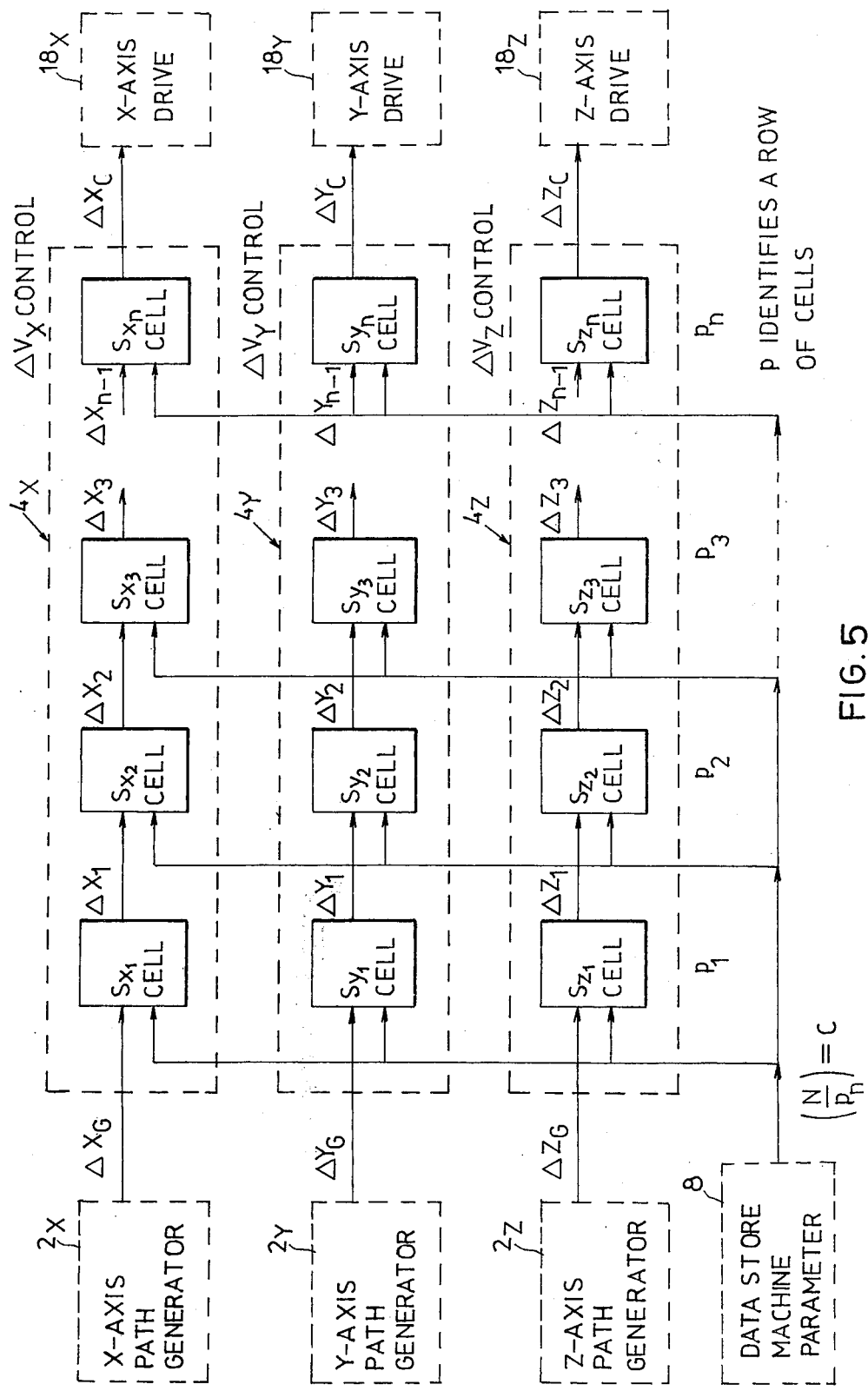
FIG. 5 is a block diagram illustrating the multi-stage arrangement of the novel velocity-change control system of FIG. 1.

FIG. 5 illustrates the multi-stage arrangement for the velocity-change control unit 4 in a multi-axis system.

The system includes a path generator, one for each axis, 2x, 2y, 2z, supplying the generated axis-pulses $\Delta X_G$, $\Delta Y_G$ and $\Delta Z_G$. The latter pulses are supplied to the velocity-change control unit 4x, 4y, 4z for the respective axis, and these units produce the command axis-pulses $\Delta X_C$, $\Delta Y_C$ and $\Delta Z_C$ which are supplied to the respective axis drive 18x, 18y and 18z.

Each of the velocity-change control units includes a plurality of stages or cells. The first cell receives the program-generated axis pulse for the respective axis, and produces an output pulse which is inputted to the subsequent cell in a series, the last cell in the series producing the command axis-pulses supplied to the respective axis drive. Thus, with respect to the X-axis, it will be seen that the program-generated axis-pulses $\Delta X_G$ are supplied to the first cell $S_{X1}$, which produces $\Delta X_1$ pulses inputted to the second cell $S_{X2}$, that cell in turn producing $\Delta X_2$ pulses inputted to the next cell in the sequence, and so on to the last cell in the sequence $SX_n$ which outputs the command axis-pulses $\Delta X_C$ for the X-axis.

The Y-axis and Z-axis velocity-change control units 4y and 4z, respectively, include the identical number of cells as in the X-axis, receive the program-generated axis-pulses $\Delta Y_G$, $\Delta Z_G$ from their respective path generators 2y, 2z, and output the command axis-pulses $\Delta Y_C$, $\Delta Z_C$ to their respective axes drive 18y, 18z.

The data store 8, which as noted above supplies the fixed constant N corresponding to the desired velocity-change characteristics of the system, is common to all the axes. This value N is divided by the number of cells in each of the velocity control units 4 to produce a value labelled C, which is identical for each cell. Thus, whenever it is desired to change the acceleration and deceleration characteristics of the system, it is only necessary to change the value N stored in the data store 8. The characteristic behaviour can also be modified by changing the frequency of the $\Delta t$ pulses. The timing generator (6 in FIG. 1), which supplies the timing pulses $\Delta t$ at a fixed frequency, is not illustrated in FIG. 5.

Figure 6:
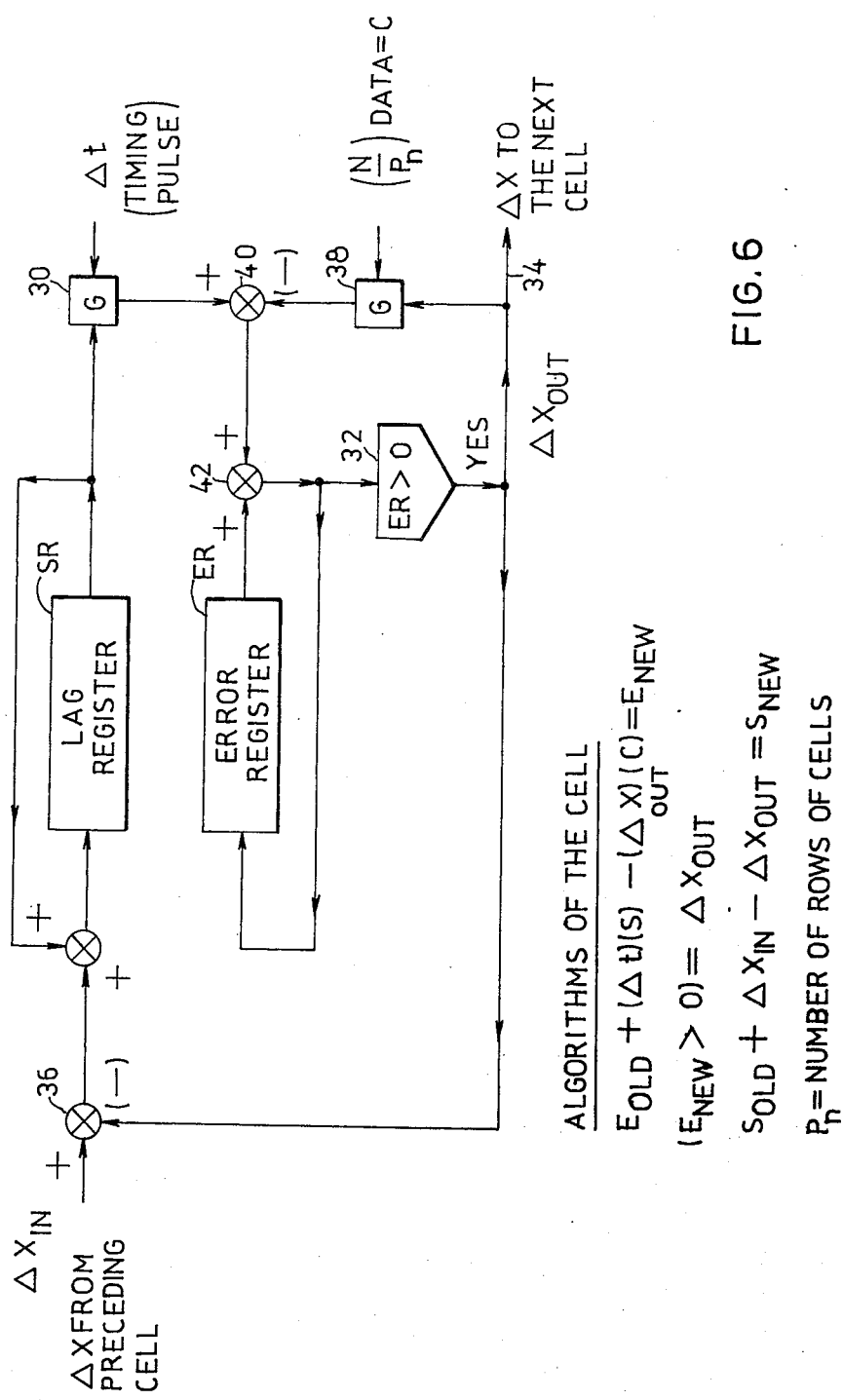
FIG. 6 is a diagram illustrating the operation of one stage or cell in the system of FIG. 5.

The operation of a single cell in the velocity-change control unit for one axis (the X-axis) is illustrated in FIG. 6.

Each cell includes a data register SR which accumulates the output pulses ($\Delta X_{IN}$) from the preceding cell. As mentioned above, the first cell in the series receives the program-generated axis-pulses from its respective path generator 2. The cell also includes an error register ER. At a fixed frequency, determined by timing pulses $\Delta t$, the contents of the lag register SR are added to the contents of the error register ER by incrementing the error register by the amount of the lag register via gate 30. A sign detector 32 continually checks the sign of the error register ER. If the error register is detected to contain a positive number, a $\Delta X$ pulse is produced on output line 34 and is applied to the next cell in the sequence. In addition, the $\Delta X$ pulse subtracts one unit, via summing point 36, from the contents of the lag register SR. Further, the ΔX pulse is applied to gate 38 to cause the constant value C to be subtracted from the error register ER via summing points 40 and 42.

The ΔX pulses will continue to be generated until the error register ER becomes zero or negative. When this occurs, as detected by sign detector 32, the generation of further ΔX pulses will terminate until the timing pulses causes the error register ER to again become positive.

The ΔX pulses produced in one cell are outputted to the next succeeding cell in the series, and the last cell produces the command axis-pulses $\Delta X_c$ applied to the respective axis-drive.

The above-described velocity-change control system can be readily implemented by the use of time-sharing logic so that the hardware costs will be minimal.

With respect to the deceleration behaviour of the novel control system, it can be shown that the following formula describes the output velocity as a function of time of the "n"th cell of the novel control system for the case where the input goes in one step from velocity $v_o$ to zero:

$$v_n = \left[ \frac{1}{(n-1)!} \left( \frac{\Sigma \Delta t}{C} \right)^{n-1} + \frac{1}{(n-2)!} \left( \frac{\Sigma \Delta t}{C} \right)^{n-2} + \cdots + \left( \frac{\Sigma \Delta t}{C} \right) + 1 \right] v_o \epsilon^{-\left( \frac{\Sigma \Delta t}{C} \right)} \quad \text{Eq. (2)}$$

With respect to the acceleration behavior, it can be shown that the following formula describes the velocity of the output of cell number "n" during acceleration when the input steps from zero to $v_o$ velocity:

$$v_n \text{ ACCEL.} = v_o - \left[ \frac{1}{(n-1)!} \left( \frac{\Sigma \Delta t}{C} \right)^{n-1} + \frac{1}{(n-2)!} \left( \frac{\Sigma \Delta t}{C} \right)^{n-2} + \cdots + \left( \frac{\Sigma \Delta t}{C} \right) + 1 \right] v_o \epsilon^{-\left( \frac{\Sigma \Delta t}{C} \right)} \quad \text{Eq. (3)}$$

Figure 7:
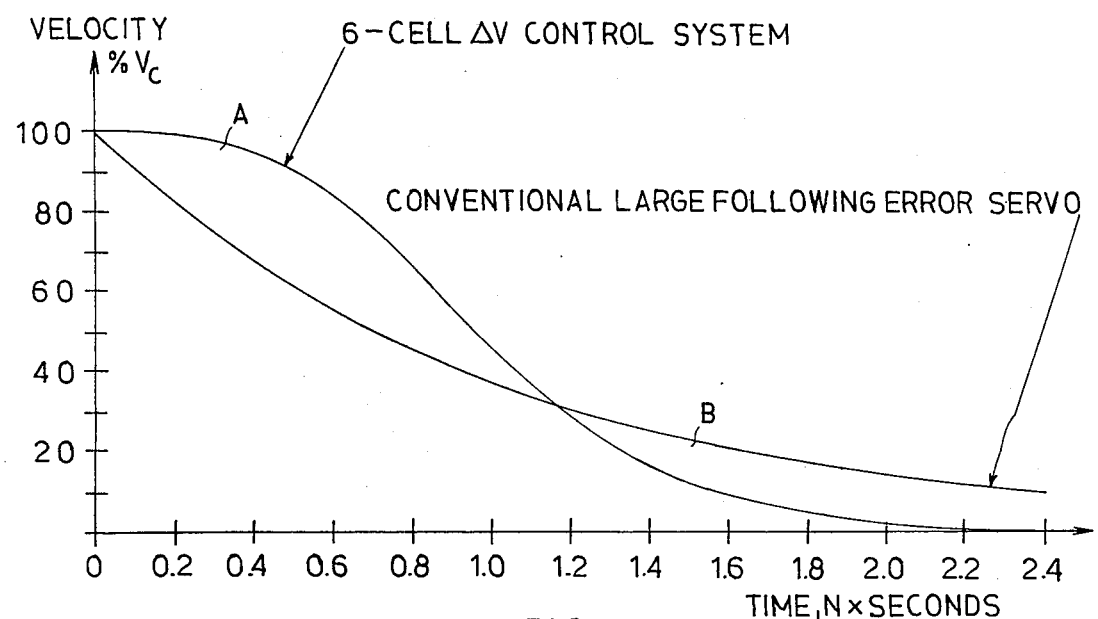
FIG. 7 is a chart comparing the deceleration characteristics of a conventional large following-error servo system with a six-stage control system constructed in accordance with FIGS. 1, 5 and 6.
Figure 8:
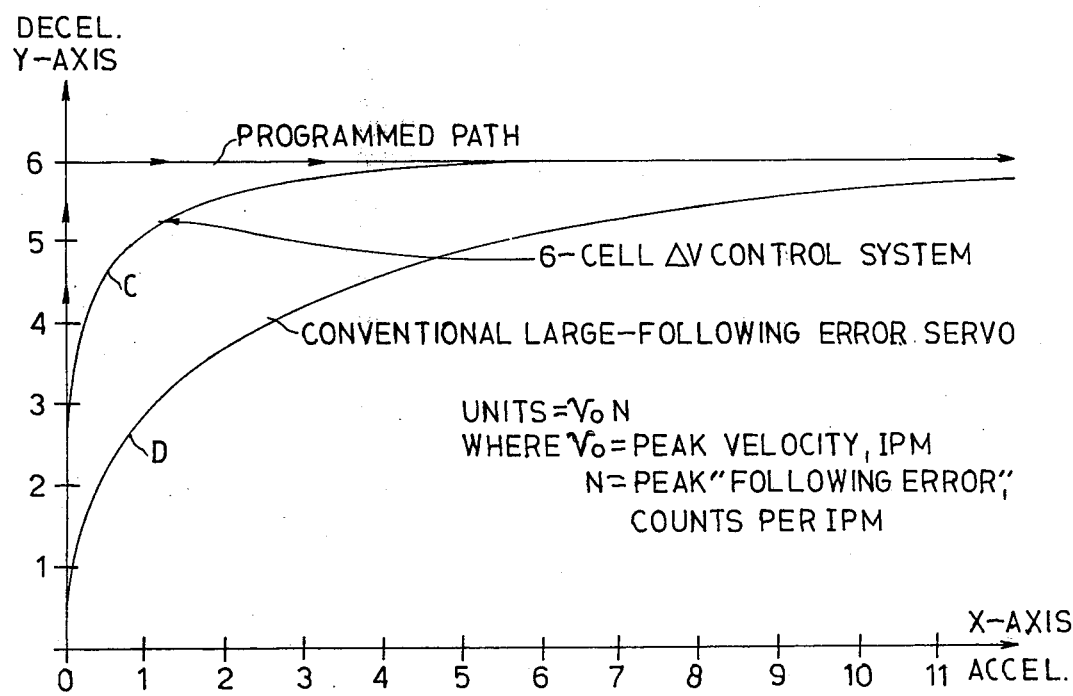
FIG. 8 is another chart comparing the deviation from the path of a programmed right-angle corner, of a conventional large following-error servo system with a six-cell control system constructed in accordance with FIGS. 1, 5 and 6.

It will be appreciated that the greater the number of cells, the greater will be the path accuracy. FIGS. 7 and 8 illustrate the behaviour of a 6-cell system.

FIG. 7 compares the deceleration characteristics of a 6-cell system constructed in accordance with the invention (Curve A) with the deceleration characteristics of a conventional following-error servo system (Curve B). For both cases there is a step velocity command of $V_o$ to zero at $t$ = zero, and in each case the distance between the generated and the actual position is initially N counts. That is, both have the same magnitude of input velocity down-step and the same initial "following-error". In the case of the novel velocity-change control system (Curve A), the following-error is the stored difference (an integer) between the generated position from the path generator and the output commanded position supplied to the small following-error servo. In the novel 6-cell system (Curve A), it can be shown that the maximum deceleration is equal to 1.053 $V_o/N$ at $t$ = 0.833 N., whereas in the conventional large-following error servo system, the maximum deceleration is equal to 1.0 $V_o/N$ at $t$ = 0. It is to be noted that the maximum deceleration is within 6% of being the same for the two different systems.

Now, see FIG. 8 which compares the deviation from the path of a programed right angled corner of the novel 6-cell system (Curve C) with a conventional large following-error servo system (Curve D). Both systems approach and leave the corner at the same full programmed speed and both have the same following-error as before. It is to be noted that even though the novel control system (Curve C) has practically the same acceleration and deceleration as indicated in FIG. 7, nevertheless the path deviation is only one-third that of the largere following-error type servo.

What is true for this corner case shown in FIG. 8 will also be true for any curved path; namely that the novel system compared to the commonly used low-gain large following-error system will produce substantially smaller position errors for the same path velocities and with no greater magnitude of accelerations or decelerations.

Demonstration of the validity of Equations (2) and (3) above is provided by the attached tables. These tables compare examples of the output generated by the operation of the novel velocity-change control system and the output computed using these equations. The results are an exact correlation, as the differences are less than a pulse unit.

Note, that from the algorithms shown on FIG. 6 we can see that on the average:

$$\Delta x / \Delta t = S/C = \text{the commanded velocity}$$

and as C is a constant, the quantity S is proportional to the velocity produced by the cell. That fact is the basis of the comparison in these tables.

Tables 1–4 below illustrate the deceleration behaviour of Cell Nos. 1–4, respectively, from the initial velocity (Vo) to zero. From Eq. (3) above, it will be seen that the following velocity computations apply to the four cells:

TABLE A

| EXAMPLE TABLE | CELL n | VELOCITY COMPUTATION FORMULA |
|---|---|---|
| 1 | 1 | $v_1 = 30\epsilon \dfrac{-\Sigma \Delta t}{30}$ |
| 2 | 2 | $v_2 = \left[ \left( \dfrac{\Sigma \Delta t}{30} \right) + 1 \right] 30\epsilon \dfrac{-\Sigma \Delta t}{30}$ |
| 3 | 3 | $v_3 = \left[ \dfrac{1}{2} \left( \dfrac{\Sigma \Delta t}{30} \right)^2 + \left( \dfrac{\Sigma \Delta t}{30} \right) + 1 \right] 30\epsilon \dfrac{-\Sigma \Delta t}{30}$ |

TABLE A-continued

| EXAMPLE TABLE | CELL n | VELOCITY COMPUTATION FORMULA |
|---|---|---|
| 4 | 4 | $v_4 = \left[ \dfrac{1}{6}\left(\dfrac{\Sigma \Delta t}{30}\right)^3 + \dfrac{1}{2}\left(\dfrac{\Sigma \Delta t}{30}\right)^2 + \left(\dfrac{\Sigma \Delta t}{30}\right) + 1 \right] 30\epsilon^{-\frac{\Sigma \Delta t}{30}}$ |

NOTES

1. In the above evaluation of the deceleration computation formula, the following values have been assigned: $C = 30$ ; $v_o = 30$
2. In all the above listed examples, the following are the algorithms that were used to generate the output of the particular cells:
   $E_{OLD} + \Delta t.s - 30 \cdot (\Delta C_{OUT}) = E_{NEW}$
   $(\Delta C_{OUT}) = (E_{NEW} > 0)$
   $S_{OLD} - \Delta C_{OUT} + \Delta C_{IN} = S_{NEW}$
3. The output of one cell becomes the output for the next. In the case of the first cell, the input is zero as a velocity step to zero is being here considered.
4. The initial value of "S" is here considered to have for each cell the value of 30. That represents a situation where the initial output velocity is constant and at its maximum value.
5. The algorithms operate such as to cause the error register "E" to always tend toward a zero value. This results in the following:

$$\sum_{o}^{n} (\Delta t)S - \sum_{o}^{n} 30 (\Delta C_{OUT}) = 0$$

OR:
$$\dfrac{\sum_{o}^{n} \Delta C_{OUT}}{\sum_{o}^{n} \Delta t} = \dfrac{S}{30} = v$$

The term on the left is distance divided by time which is an expression for velocity. Thus the above shows that the output velocity is proportional to the generated quantity "S". In each of the tabulated examples, correlation is shown between that generated quantity "S" and the velocity computed using the above given formula, that proves the formula does represent the deceleration behaviour of the $\Delta V$ control system for a velocity step input to zero.

Table 5 below illustrates the computation of the position as a function of time of the output of Cell No. 4, this being computed as follows:

Having the equation of the velocity as a function of time, the position can be determined thusly:

$$\text{Distance} = \int_o^t v \, dt$$

To show how this can be done, consider the four-cell $\Delta V$ control system of the previous examples, Tables 1–4.

$$v_4 = \left[ \dfrac{1}{6}\left(\dfrac{\Sigma \Delta t}{30}\right)^3 + \dfrac{1}{2}\left(\dfrac{\Sigma \Delta t}{30}\right)^2 + \left(\dfrac{\Sigma \Delta t}{30}\right) + 1 \right] \dfrac{30\epsilon^{-\frac{\Sigma \Delta t}{30}}}{30}$$

$$(\text{DISTANCE})_4 = \int_o^t \left[ \dfrac{t^3}{6\cdot 30^2} + \dfrac{t^2}{2\cdot 30^2} + \dfrac{t}{30} + 1 \right] \epsilon^{-\frac{t}{30}} dt$$

Here $$t = \Sigma \Delta t$$

The following provides the solution to the type of integral in the above expression;

$$\int t^p \epsilon^{-\frac{t}{A}} = -A\epsilon^{-\frac{t}{A}} \left[ p!A^p + \sum_{n=p}^{n=1} \dfrac{p!}{n!} A^{-p-n} t^n \right]$$

From the above general solution, the following can be obtained for the different values assigned to $p$:

$$\int t\epsilon^{-\frac{t}{30}} dt = -30\epsilon^{-\frac{t}{30}}(t+30)$$

$$\int t^2\epsilon^{-\frac{t}{30}} dt = -30\epsilon^{-\frac{t}{30}}(t^2 + 2\cdot 30 t + 2\cdot 30^2)$$

$$\int t^3\epsilon^{-\frac{t}{30}} dt = -30\epsilon^{-\frac{t}{30}}(t^3 + 3\cdot 30 t^2 + 6\cdot 30^2 t + 6\cdot 30^3)$$

In addition:

$$\int \epsilon^{-\frac{t}{30}} dt = -30\epsilon^{-\frac{t}{30}}$$

Substituting the above integrals into the distance relation with respect to time of the fourth cell, evaluating over the limits of integration and collecting terms, yields the following:

$$\text{DISTANCE}_{(4)} = 30\left\{4 - \left[\frac{(\frac{t}{30})^3}{6} + (\frac{t}{30})^2 + 3(\frac{t}{30}) + 4\right]\epsilon^{-\frac{t}{30}}\right\}$$

The above is the formula for computing the position with respect to time of the output of the fourth cell when the input to the ΔV control system steps to zero velocity. Table 5 shows that the computed position using the above formula correlates with the generated position. This then indicates the procedure used here to determine the formula for the position during deceleration is correct, and therefore the same method can be used for any number of cells.

Important to any contouring system is the acceleration/deceleration characteristics. Here will be determined the maximum value of the deceleration as a function of the number of cells in the ΔV control system;

Deceleration = $dv_n/dt$

Where $v_n$ = velocity behaviour as a function of $t$ of the output of cell $n$.

From calculus it is known that the maximum value of the deceleration will occur at the value of $t$ which causes:

$$d^2 v_n/dt^2 = 0$$

Previously determined is the following general expression for velocity during deceleration:

$$v_n = \left[\frac{1}{(n-1)!}\left(\frac{t}{c}\right)^{n-1} + \frac{1}{(n-2)!}\left(\frac{t}{c}\right)^{n-2} + \cdots + \left(\frac{t}{c}\right) + 1\right] v_0 \epsilon^{-\frac{t}{c}}$$

Here:

$$t = \Sigma \Delta t$$

$n$ = the number of cells

Differentiating the above, yields:

$$\frac{dv_n}{dt} = -\frac{t^{(n-1)}}{(n-1)!C^n} v_0 \epsilon^{-\frac{t}{c}} = \text{deceleration}$$

Again differentiating, yields:

$$\frac{d^2 v_n}{dt^2} = \frac{t^{n-2} v_0}{(n-1)!C^n} \epsilon^{-\frac{t}{c}}\left[-(n-1) + \frac{t}{c}\right]$$

Letting that second derivative equal zero and then solving for $t$ yields:

$$t_{MAX} = (n-1)c$$

Note that the above procedure also determines the minimum deceleration. It will be:

$$t_{min} = 0, \quad \frac{dv_n}{dt}\bigg]_{min} = 0$$

Substituting the value of the $t_{max}$ to determine the largest deceleration, yields:

$$\frac{dv_n}{dt}\bigg]_{max} = -\frac{(n-1)^{n-1}}{(n-1)!}\left(\frac{v_0}{C}\right)\epsilon^{-(n-1)}$$

Where C is the maximum counts per cell.

If the total of the maximum number stored in the cells is considered fixed irrespective of the number of cells in the system, that is:

C = N/n, where N is constant, then in that case:

$$\frac{dv_n}{dt}\bigg]_{max} = -\frac{n(n-1)^{n-1}}{(n-1)!}\left(\frac{v_0}{N}\right)\epsilon^{-(n-1)}$$

TABLE B

| CELLS | MAXIMUM $\frac{dv_n}{dt}$ | |
|---|---|---|
| n | C Max. Counts per cell, $v_0/C$ units | N/n max. counts per cell, $v_0/N$ units |
| 1 | 1. | 1. |
| 2 | 0.3679 | 0.7357 |
| 3 | 0.2707 | 0.8120 |
| 4 | 0.2240 | 0.8962 |
| 5 | 0.1954 | 0.9768 |
| 6 | 0.1755 | 1.0528 |
| 7 | 0.1606 | 1.1244 |
| 8 | 0.1490 | 1.1920 |
| 9 | 0.1396 | 1.2563 |
| 10 | 0.1318 | 1.3176 |

Tables 6 and 7 below illustrate the acceleration behavior of Cell Nos. 1 and 2, respectively, where the input is a velocity step from zero. From Eq. (3) above, it will be seen that the following velocity computations apply to these two cells:

TABLE C

| EXAMPLE TABLE | CELL n | VELOCITY COMPUTATION FORMULA |
|---|---|---|
| 6 | 1 | $v_1 = 30 - 30 \, \epsilon^{\frac{-\Sigma \Delta t}{30}}$ |
| 7 | 2 | $v_2 = 30 - \left[\left(\frac{\Sigma \Delta t}{30}\right) + 1\right] 30 \, \epsilon^{\frac{-\Sigma \Delta t}{30}}$ |

$$\frac{\text{DISTANCE} - 6}{\text{DECEL}} = v_oC\left[6 - \left\{\frac{(\frac{t}{c})^5}{120} + \frac{(\frac{t}{c})^4}{12} + \frac{(\frac{t}{c})^3}{2} + 2(\frac{t}{c})^2 + 5(\frac{t}{c}) + 6\right\} - \epsilon^{\frac{-t}{c}}\right]$$

$$\frac{\text{DISTANCE} - 6}{\text{ACCEL}} = v_oC\left[\frac{t}{c} - 6 + \left\{\frac{(\frac{t}{c})^5}{120} + \frac{(\frac{t}{c})^4}{12} + \frac{(\frac{t}{c})^3}{2} + 2(\frac{t}{c})^2 + 5(\frac{t}{c}) + 6\right\} - \epsilon^{\frac{-t}{c}}\right]$$

The notes set forth above with respect to the velocity behaviour during deceleration, also apply here.

From Tables 6 and 7 it can be seen that the generated data and data computed based on Eq. (3) above do correlate. Thus that equation has been shown valid.

Table 8 below illustrates the computation of the position as a function of time of the output of Cell No. 2 during acceleration.

As was developed above for determining the position function for the deceleration case, the formula for position during acceleration can be determined by integrating the appropriate velocity function.

For example, the formula for the output of cell No. 2 during acceleration will be as follows:

$$\frac{\text{DISTANCE} - 2}{\text{ACCEL}} = \int_0^t \frac{v_2 \, dt}{\text{ACCEL}}$$

where $v_2 = \frac{\text{computed ``S''}}{30}$ (see Note 5 above)

$v_2 = 1 - \left(\frac{t}{30} + 1\right) \epsilon^{\frac{-t}{30}}$ HERE $\Sigma \Delta t = t$ $$\frac{\text{DISTANCE} - 2}{\text{ACCEL}} = \int_0^t \left[1 - \left(\frac{t}{30} + 1\right) \epsilon^{\frac{-t}{30}}\right] dt$$

Solving the above integral yields:

$$\frac{\text{DISTANCE} - 2}{\text{ACCEL}} = t + t \, \epsilon^{\frac{-t}{30}} + 2.30 \, \epsilon^{\frac{-t}{30}} - 2.30$$

The above is the formula that was used in Table 8 to compute the position of the output of cell No. 2. The fact that it correlates with the generated position indicates the procedure to determine that formula is valid. Thus the same method can be used to determine the formula for the position as a function of time during acceleration for a $\Delta v$ control system which consists of any number of cells.

Turning now to FIG. 8 comparing the deviation of a 6-cell system from the path of a programmed right angle corner, with respect to that of a conventional large-following error servo, the formulas for the output position of a 6-cell system can be determined as follows:

Using the procedures shown above, the following formulas can be determined:

Deceleration case: input velocity down-steps from a value of $v_o$ to zero.

Acceleration case: input velocity up-steps from zero to a value of $v_o$.

The above are the parametric equations used to determine the corner path shown in FIG. 8.

Large following error servo cornering path:

$$\frac{\text{DISTANCE} - 1}{\text{DECEL}} = Nv_o\left(1 - \epsilon^{\frac{-t}{n}}\right)$$

$$\frac{\text{DISTANCE} - 2}{\text{ACCEL}} = Nv_o\left[\frac{t}{n} - 1 + \epsilon^{\frac{-t}{n}}\right]$$

The above are the parametric equations for the corner path of the large following error servo. So that a proper comparison can be made of that servo and the 6-cell $\Delta V$ control system there should be the same lag for those systems between the generated position and the actual position for any particular steady-state velocity. As the quantity "C" is the maximum per cell, we have:

$C = N/6$

That relationship was used in the plots shown in FIG. 8.

Now considered are the curved path deviations as a function of servo-following-error.

It can be shown that the following formula describes the magnitude of the path deviation for steady-state motion along a circular arc.

$E \approx E^2/2R$ for $o < E/R < 0.490$ (4)

wherein:
R = Programmed Radius
E = Servo-following-error

It can also be shown that the following relationship exists:

$R^2 = E^2 + (R - e)^2$ wherein $e$ = deviation of path

Solving the above for $e$, the deviation of path, yields the following:

$$e = R\left[1 - \sqrt{1 - \left(\frac{E}{R}\right)^2}\right]$$

The following formula provides an approximation accurate to 1%. It is based on a series expansion.

$$\sqrt{1-A} \approx 1 - A/2$$

WHERE
 $0 < A < 0.24$
HERE
 $A = (E/R)^2$ so that
 $0 < E/R < \sqrt{0.24}$
or
 $0 < E/R < 0.490$ Substituting the above in the expression for $e$ yields:

$$E \approx \left\{1 - \left[1 - \frac{1}{2}\left(\frac{E}{R}\right)^2\right]\right\}$$

$E \approx E^2/2R$ FOR $0 < E/R < 0.490$

Thus, Eq. (4) above is the formula to determine the magnitude of the path deviation for steady-state motion along a circular arc.

To compare the magnitude of the path deviation from a programmed circular path that is produced by a low-gain large following-error type servo and the path deviation produced by a 6-cell $\Delta V$ control-system. Consider for both cases that the programmed path has a radius of 2 inches and the system has a resolution of 0.0001 inches per pulse. Assume for the purposes of this example that the feedrate is 45 IPM along the circular path and that the gain is 0.5 IPM per mil for the low-gain servo that figures out to:

45 IPM × MIL/0.5 IPM × 10 COUNTS/MIL × 900 COUNTS FOLLOWING ERROR

For the low-gain servo:

$e = E^2/2R = 900^2/2 \times 20000 = 20.25$ COUNTS POSITION ERROR

For the $\Delta V$ control-system with 6 cells
Keeping the total following-error the same as for the low-gain servo.

E/CELL = 900/6 = 150 COUNTS/CELL $e \approx E^2/2R = 150^2/2 \times 20000 = 0.5625$ COUNTS POSITION ERROR PER CELL Total path deviation

6 CELLS × 0.5625 COUNTS ERROR/CELL = 3.375 COUNTS POSITION ERROR

TABLE I

| | | | DECELERATION BEHAVIOR OF CELL NO. 1 | | | | |
|---|---|---|---|---|---|---|---|
| | | | OUTPUT | GENERATED | COMPUTED | | ERROR |
| E $-(\Delta C)$ 30 | E $+(\Delta t)$ S | $\Sigma\Delta 21$ | $\Delta C$ | S | $30\epsilon$ | $\frac{-\Sigma\Delta t}{30}$ | COMPUTED $-S$ |
| 0 | 0 | 0 | 0 | 30 | 30. | | 0 |
| 0 | 30 | 1 | 1 | 29 | 29.016 | | 0.016 |
| 0 | 29 | 2 | 1 | 28 | 28.065 | | 0.065 |
| −1 | 27 | 3 | 1 | 27 | 27.145 | | 0.145 |
| −3 | 24 | 4 | 1 | 26 | 26.255 | | 0.255 |
| −6 | 20 | 5 | 1 | 25 | 25.394 | | 0.394 |
| −10 | 15 | 6 | 1 | 24 | 24.562 | | 0.562 |
| −15 | 9 | 7 | 1 | 23 | 23.757 | | 0.757 |
| −21 | 2 | 8 | 1 | 22 | 22.978 | | 0.978 |
| −28 | −6 | 9 | 0 | | 22.225 | | 0.225 |
| | 16 | 10 | 1 | 21 | 21.496 | | 0.496 |
| −14 | 7 | 11 | 1 | 20 | 20.791 | | 0.791 |
| −23 | −3 | 12 | 0 | | 20.110 | | 0.110 |
| | 17 | 13 | 1 | 19 | 19.450 | | 0.450 |
| −13 | 6 | 14 | 1 | 18 | 18.813 | | 0.813 |
| −24 | −6 | 15 | 0 | | 18.196 | | 0.196 |
| | 12 | 16 | 1 | 17 | 17.599 | | 0.599 |
| −18 | −1 | 17 | 0 | | 17.022 | | 0.022 |
| | 16 | 18 | 1 | 16 | 16.464 | | 0.464 |
| −14 | 2 | 19 | 1 | 15 | 15.925 | | 0.925 |
| −28 | −13 | 20 | 0 | | 15.403 | | 0.403 |
| | 2 | 21 | 1 | 14 | 14.898 | | 0.898 |
| −28 | −14 | 22 | 0 | | 14.409 | | 0.409 |
| | 0 | 23 | 0 | | 13.937 | | −0.063 |
| | 14 | 24 | 1 | 13 | 13.480 | | 0.480 |
| −16 | −3 | 25 | 0 | | 13.038 | | 0.038 |
| | 10 | 26 | 1 | 12 | 12.611 | | 0.611 |
| −20 | −8 | 27 | 0 | | 12.197 | | 0.197 |
| | 4 | 28 | 1 | 11 | 11.797 | | 0.797 |
| −26 | −15 | 29 | 0 | | 11.410 | | 0.410 |
| | −4 | 30 | 0 | | 11.036 | | 0.036 |
| | 7 | 31 | 1 | 10 | 10.675 | | 0.675 |
| −23 | −13 | 32 | 0 | | 10.325 | | 0.325 |
| | −3 | 33 | 0 | | 9.986 | | −0.014 |
| | 7 | 34 | 1 | 9 | 9.659 | | 0.659 |
| −23 | −14 | 35 | 0 | | 9.342 | | 0.342 |
| | −5 | 36 | 0 | | 9.036 | | 0.036 |
| | 4 | 37 | 1 | 8 | 8.740 | | 0.740 |
| −26 | −18 | 38 | 0 | | 8.453 | | 0.453 |
| | −10 | 39 | 0 | | 8.176 | | 0.176 |
| | −2 | 40 | 0 | | 7.908 | | −0.092 |
| | 6 | 41 | 1 | 7 | 7.649 | | 0.649 |
| −24 | −17 | 42 | 0 | | 7.398 | | 0.398 |
| | −10 | 43 | 0 | | 7.155 | | 0.155 |
| | −3 | 44 | 0 | | 6.921 | | −0.079 |
| | 4 | 45 | 1 | 6 | 6.694 | | 0.694 |

TABLE I-continued

DECELERATION BEHAVIOR OF CELL NO. 1

| E −(ΔC) 30 | E +(Δt) S | ΣΔ21 | OUTPUT ΔC | GENERATED S | COMPUTED 30ε $\frac{-\Sigma \Delta t}{30}$ | ERROR COMPUTED −S |
|---|---|---|---|---|---|---|
| −26 | −20 | 46 | 0 | | 6.474 | 0.474 |
| | −14 | 47 | 0 | | 6.262 | 0.262 |
| | −8 | 48 | 0 | | 6.057 | 0.057 |
| | −2 | 49 | 0 | | 5.858 | 0.858 |
| | 4 | 50 | 1 | 5 | 5.666 | 0.666 |
| −26 | −21 | 51 | 0 | | 5.481 | 0.481 |
| | −16 | 52 | 0 | | 5.301 | 0.301 |
| | −11 | 53 | 0 | | 5.127 | 0.127 |
| | −6 | 54 | 0 | | 4.959 | −0.041 |
| | −1 | 55 | 0 | | 4.796 | −0.204 |
| | 4 | 56 | 1 | 4 | 4.639 | 0.639 |
| −26 | −22 | 57 | 0 | | 4.487 | 0.487 |
| | −18 | 58 | 0 | | 4.340 | 0.340 |
| | −14 | 59 | 0 | | 4.198 | 0.198 |
| | −10 | 60 | 0 | | 4.060 | 0.060 |
| | −6 | 61 | 0 | | 3.927 | −0.073 |
| | −2 | 62 | 0 | | 3.798 | −0.202 |
| | 2 | 63 | 1 | 3 | 3.674 | 0.674 |
| −28 | −25 | 64 | 0 | | 3.553 | 0.553 |
| | −22 | 65 | 0 | | 3.437 | 0.437 |
| | −19 | 66 | 0 | | 3.324 | 0.324 |
| | −16 | 67 | 0 | | 3.215 | 0.215 |
| | −13 | 68 | 0 | | 3.110 | 0.110 |

TABLE 2

DECELERATION BEHAVIOUR OF CELL NO. 2

| INPUT | | | | OUTPUT | GENERATED | COMPUTED | ERROR |
|---|---|---|---|---|---|---|---|
| ΔC1 | E −ΔC$_2$+30 | E +Δt.S$_2$ | ΣΔt | ΔC2 | S2 | COMPUTED | −S2 |
| 0 | 0 | 0 | 0 | 0 | 30 | 30 | 0 |
| 1 | 0 | 30 | 1 | 1 | 30 | 29.984 | −0.016 |
| 1 | 0 | 30 | 2 | 1 | 30 | 29.936 | −0.064 |
| 1 | 0 | 30 | 3 | 1 | 30 | 29.860 | −0.140 |
| 1 | 0 | 30 | 4 | 1 | 30 | 29.756 | −0.244 |
| 1 | 0 | 30 | 5 | 1 | 30 | 29.627 | −0.373 |
| 1 | 0 | 30 | 6 | 1 | 30 | 29.474 | −0.526 |
| 1 | 0 | 30 | 7 | 1 | 30 | 29.300 | −0.700 |
| 1 | 0 | 30 | 8 | 1 | 30 | 29.105 | −0.895 |
| 0 | 0 | 30 | 9 | 1 | 29 | 28.892 | −0.108 |
| 1 | 0 | 29 | 10 | 1 | 29 | 28.661 | −0.339 |
| 1 | −1 | 28 | 11 | 1 | 29 | 28.415 | −0.585 |
| 0 | −2 | 27 | 12 | 1 | 28 | 28.153 | 0.153 |
| 1 | −3 | 25 | 13 | 1 | 28 | 27.879 | −0.121 |
| 1 | −5 | 23 | 14 | 1 | 28 | 27.592 | −0.408 |
| 0 | −7 | 21 | 15 | 1 | 27 | 27.294 | 0.294 |
| 1 | −9 | 18 | 16 | 1 | 27 | 26.986 | −0.014 |
| 0 | −12 | 14 | 17 | 1 | 26 | 26.668 | 0.668 |
| 1 | −16 | 10 | 18 | 1 | 26 | 26.343 | 0.343 |
| 1 | −20 | 6 | 19 | 1 | 26 | 26.010 | 0.010 |
| 0 | −24 | 2 | 20 | 1 | 25 | 25.671 | 0.671 |
| 1 | −28 | −3 | 21 | 0 | 26 | 25.326 | −0.674 |
| 0 | | 23 | 22 | 1 | 25 | 24.976 | −0.024 |
| 0 | −7 | 18 | 23 | 1 | 24 | 24.622 | 0.622 |
| 1 | −12 | 12 | 24 | 1 | 24 | 24.264 | 0.264 |
| 0 | −18 | 6 | 25 | 1 | 23 | 23.903 | 0.903 |
| 1 | −24 | −1 | 26 | 0 | 24 | 23.540 | −0.460 |
| 0 | | 23 | 27 | 1 | 23 | 23.174 | 0.174 |
| 1 | −7 | 16 | 28 | 1 | 23 | 22.808 | −0.192 |
| 0 | −14 | 9 | 29 | 1 | 22 | 22.441 | 0.441 |
| 0 | −21 | 1 | 30 | 1 | 21 | 22.073 | 1.073 |
| 1 | −29 | −8 | 31 | 0 | 22 | 21.705 | −0.295 |
| 0 | | 14 | 32 | 1 | 21 | 21.338 | 0.338 |
| 0 | −16 | 5 | 33 | 1 | 20 | 20.971 | 0.971 |
| 1 | −25 | −5 | 34 | 0 | 21 | 20.605 | −0.395 |
| 0 | | 16 | 35 | 1 | 20 | 20.241 | 0.241 |
| 0 | −14 | 6 | 36 | 1 | 19 | 19.879 | 0.879 |
| 1 | −24 | −5 | 37 | 0 | 20 | 19.518 | −0.482 |
| 0 | | 15 | 38 | 1 | 19 | 19.160 | 0.160 |
| 0 | −15 | 4 | 39 | 1 | 18 | 18.805 | 0.805 |
| 0 | −26 | −8 | 40 | 0 | 18 | 18.452 | 0.452 |
| 1 | | 10 | 41 | 1 | 18 | 18.102 | 0.102 |
| 0 | −20 | −2 | 42 | 0 | 18 | 17.755 | −0.245 |
| 0 | | 16 | 43 | 1 | 17 | 17.411 | 0.411 |
| 0 | −14 | 3 | 44 | 1 | 16 | 17.071 | 1.071 |
| 1 | −27 | −11 | 45 | 0 | 17 | 16.735 | −0.265 |
| 0 | | 6 | 46 | 1 | 16 | 16.402 | 0.402 |
| 0 | −24 | −8 | 47 | 0 | 16 | 16.073 | 0.073 |
| 0 | | 8 | 48 | 1 | 15 | 15.748 | 0.748 |
| 0 | −22 | −7 | 49 | 0 | 15 | 15.427 | 0.427 |
| 1 | | 8 | 50 | 1 | 15 | 15.110 | 0.110 |
| 0 | −22 | −7 | 51 | 0 | 15 | 14.797 | −0.203 |
| 0 | | 8 | 52 | 1 | 14 | 14.489 | 0.489 |

TABLE 2-continued

DECELERATION BEHAVIOUR OF CELL NO. 2

| INPUT | | | | OUTPUT | GENERATED | COMPUTED | ERROR |
|---|---|---|---|---|---|---|---|
| $\Delta C1$ | E<br>$-\Delta C_2+30$ | E<br>$+\Delta t.S_2$ | $\Sigma \Delta t$ | $\Delta C2$ | $S2$ | | COMPUTED<br>$-S2$ |
| 0 | −22 | −8 | 53 | 0 | 14 | 14.185 | 0.185 |
| 0 |  | 6 | 54 | 1 | 13 | 13.885 | 0.885 |
| 0 | −24 | −11 | 55 | 0 | 13 | 13.590 | 0.590 |
| 1 |  | 2 | 56 | 1 | 13 | 13.299 | 0.299 |
| 0 | −28 | −15 | 57 | 0 | 13 | 13.012 | 0.012 |
| 0 |  | −2 | 58 | 0 | 13 | 12.731 | −0.269 |
| 0 |  | 11 | 59 | 1 | 12 | 12.453 | 0.453 |
| 0 | −19 | −7 | 60 | 0 | 12 | 12.180 | 0.180 |
| 0 |  | 5 | 61 | 1 | 11 | 11.912 | 0.912 |
| 0 | −25 | −14 | 62 | 0 | 11 | 11.648 | 0.648 |
| 1 |  | −3 | 63 | 0 | 12 | 11.388 | −0.612 |
| 0 |  | 9 | 64 | 1 | 11 | 11.134 | 0.134 |
| 0 | −21 | −10 | 65 | 0 | 11 | 10.883 | −0.117 |
| 0 |  | 1 | 66 | 1 | 10 | 10.637 | 0.637 |
| 0 | −29 | −19 | 67 | 0 | 10 | 10.396 | 0.396 |

TABLE 3

DECELERATION BEHAVIOUR OF CELL NO. 3

| INPUT | | | | OUTPUT | GENERATED | COMPUTED | ERROR |
|---|---|---|---|---|---|---|---|
| $\Delta C_2$ | E−<br>$\Delta C_3.30$ | E+<br>$\Delta t.S_3$ | $\Sigma \Delta t$ | $\Delta C_3$ | $S_3$ | | COMPUTED<br>$-S_3$ |
| 0 | 0 | 0 | 0 | 0 | 30 | 30 | 0 |
| 1 | 0 | 30 | 1 | 1 | 30 | 29.9998 | −0.0002 |
| 1 | 0 | 30 | 2 | 1 | 30 | 29.9986 | −0.0014 |
| 1 | 0 | 30 | 3 | 1 | 30 |  |  |
| 1 | 0 | 30 | 4 | 1 | 30 |  |  |
| 1 | 0 | 30 | 5 | 1 | 30 | 29.9796 | −0.0204 |
| 1 | 0 | 30 | 6 | 1 | 30 |  |  |
| 1 | 0 | 30 | 7 | 1 | 30 |  |  |
| 1 | 0 | 30 | 8 | 1 | 30 |  |  |
| 1 | 0 | 30 | 9 | 1 | 30 | 29.8920 | −0.1080 |
| 1 | 0 | 30 | 10 | 1 | 30 |  |  |
| 1 | 0 | 30 | 11 | 1 | 30 |  |  |
| 1 | 0 | 30 | 12 | 1 | 30 |  |  |
| 1 | 0 | 30 | 13 | 1 | 30 |  |  |
| 1 | 0 | 30 | 14 | 1 | 30 |  |  |
| 1 | 0 | 30 | 15 | 1 | 30 | 29.5684 | −0.4316 |
| 1 | 0 | 30 | 16 | 1 | 30 |  |  |
| 1 | 0 | 30 | 17 | 1 | 30 |  |  |
| 1 | 0 | 30 | 18 | 1 | 30 | 29.3065 | −0.6935 |
| 1 | 0 | 30 | 19 | 1 | 30 |  |  |
| 1 | 0 | 30 | 20 | 1 | 30 | 29.0936 | −0.9064 |
| 0 | 0 | 30 | 21 | 1 | 29 | 28.9758 | −0.0242 |
| 1 | 0 | 29 | 22 | 1 | 29 |  |  |
| 1 | −1 | 28 | 23 | 1 | 29 |  |  |
| 1 | −2 | 27 | 24 | 1 | 29 | 28.577 | −0.423 |
| 1 | −3 | 26 | 25 | 1 | 29 |  |  |
| 0 | −4 | 25 | 26 | 1 | 28 | 28.276 | 0.276 |
| 1 | −5 | 23 | 27 | 1 | 28 |  |  |
| 1 | −7 | 21 | 28 | 1 | 28 | 27.946 | −0.054 |
| 1 | −9 | 19 | 29 | 1 | 28 |  |  |
| 1 | −11 | 17 | 30 | 1 | 28 | 27.591 | −0.409 |
| 0 | −13 | 15 | 31 | 1 | 27 |  |  |
| 1 | −15 | 12 | 32 | 1 | 27 | 27.211 | 0.211 |
| 1 | −18 | 9 | 33 | 1 | 27 |  |  |
| 0 | −21 | 6 | 34 | 1 | 26 | 26.808 | 0.808 |
| 1 | −24 | 2 | 35 | 1 | 26 |  |  |
| 1 | −28 | −2 | 36 | 0 | 27 | 26.385 | −0.615 |
| 0 |  | 25 | 37 | 1 | 26 |  |  |
| 1 | −5 | 21 | 38 | 1 | 26 | 25.942 | −0.058 |
| 1 | −9 | 17 | 39 | 1 | 26 |  |  |
| 0 | −13 | 13 | 40 | 1 | 25 | 25.481 | 0.481 |
| 1 | −17 | 8 | 41 | 1 | 25 |  |  |
| 0 | −22 | 3 | 42 | 1 | 24 | 25.005 | 1.005 |
| 1 | −27 | −3 | 43 | 0 | 25 |  |  |
| 1 |  | 22 | 44 | 1 | 25 | 24.515 |  |
| 0 | −8 | 17 | 45 | 1 | 24 |  |  |
| 1 | −13 | 11 | 46 | 1 | 24 | 24.013 | 0.013 |
| 0 | −19 | 5 | 47 | 1 | 23 |  |  |
| 1 | −25 | −2 | 48 | 0 | 24 | 23.501 | −0.499 |
| 0 |  | 22 | 49 | 1 | 23 |  |  |
| 1 | −8 | 15 | 50 | 1 | 23 | 22.980 | −0.020 |
| 0 | −15 | 8 | 51 | 1 | 22 |  |  |
| 1 | −22 | 0 | 52 | 0 | 23 | 22.452 | −0.548 |
| 0 |  | 23 | 53 | 1 | 22 |  |  |
| 1 | −7 | 15 | 54 | 1 | 22 | 21.919 | −0.081 |
| 0 | −15 | 7 | 55 | 1 | 21 |  |  |
| 1 | =23 | −2 | 56 | 0 | 22 | 21.381 | −0.619 |
| 0 |  | 20 | 57 | 1 | 21 |  |  |
| 0 | −10 | 11 | 58 | 1 | 20 | 20.841 | 0.841 |
| 1 | −19 | 1 | 59 | 1 | 20 |  |  |
| 0 | −29 | −9 | 60 | 0 | 20 | 20.300 | 0.300 |

TABLE 3-continued

DECELERATION BEHAVIOUR OF CELL NO. 3

| INPUT | | | | OUTPUT | GENERATED | COMPUTED | ERROR |
|---|---|---|---|---|---|---|---|
| $\Delta C_2$ | E− $\Delta C_3.30$ | E+ $\Delta t.S_3$ | $\Sigma \Delta t$ | $\Delta C_3$ | $S_3$ | | COMPUTED $-S_3$ |
| 1 | | 11 | 61 | 1 | 20 | | |
| 0 | −19 | 1 | 62 | 1 | 19 | 19.759 | 0.759 |
| 0 | −29 | −10 | 63 | 0 | 19 | | |
| 1 | | 9 | 64 | 1 | 19 | 19.219 | 0.219 |
| 0 | −21 | −2 | 65 | 0 | 19 | | |
| 1 | | 17 | 66 | 1 | 19 | 18.681 | −0.319 |
| 0 | −13 | 6 | 67 | 1 | 18 | | |
| 0 | −24 | −6 | 68 | 0 | 18 | 18.147 | 0.147 |
| 1 | | 12 | 69 | 1 | 18 | | |
| 0 | −18 | 0 | 70 | 0 | 18 | | |
| 0 | | 18 | 71 | 1 | 17 | | |
| 0 | −12 | 5 | 72 | 1 | 16 | | |
| 1 | −25 | −9 | 73 | 0 | 17 | 16.831 | −0.169 |
| 0 | | 8 | 74 | 1 | 16 | | |
| 0 | −22 | −6 | 75 | 0 | 16 | | |
| 1 | | 10 | 76 | 1 | 16 | | |
| 0 | −20 | −4 | 77 | 0 | 16 | | |
| 0 | | 12 | 78 | 1 | 15 | | |
| 0 | −18 | −3 | 79 | 0 | 15 | | |
| 1 | | 12 | 80 | 1 | 15 | | |
| 0 | −18 | −3 | 81 | 0 | 15 | | |
| 0 | | 12 | 82 | 1 | 14 | | |
| 0 | −18 | −4 | 83 | 0 | 14 | | |
| 1 | | 10 | 84 | 1 | 14 | | |
| 0 | −20 | −6 | 85 | 0 | 14 | 13.846 | −0.154 |
| 0 | | 8 | 86 | 1 | 13 | | |
| 0 | −22 | −9 | 87 | 0 | 13 | | |
| 0 | | 4 | 88 | 1 | 12 | | |
| 1 | −26 | −14 | 89 | 0 | 13 | | |
| 0 | | −1 | 90 | 0 | 13 | | |
| 0 | | 12 | 91 | 1 | 12 | | |
| 0 | −18 | −6 | 92 | 0 | 12 | | |
| 0 | | 6 | 93 | 1 | 11 | | |
| 1 | −24 | −13 | 94 | 0 | 12 | | |
| 0 | | −1 | 95 | 0 | 12 | | |
| 0 | | 11 | 96 | 1 | 11 | | |
| 0 | −19 | −8 | 97 | 0 | 11 | | |
| 0 | | 3 | 98 | 1 | 10 | | |
| 0 | −27 | −17 | 99 | 0 | 10 | | |
| 1 | | −7 | 100 | 0 | 11 | | |
| 0 | | 4 | 101 | 1 | 10 | 10.386 | 0.386 |

TABLE 4

DECELERATION BEHAVIOUR OF CELL NO. 4

| INPUT | | | | OUTPUT | GENERATED | COMPUTED | ERROR |
|---|---|---|---|---|---|---|---|
| $\Delta C_3$ | E− $\Delta C_4.30$ | E+ $\Delta t.S_4$ | $\Sigma \Delta t$ | $\Delta C_4$ | $S_4$ | | COMPUTED $-S_4$ |
| 0 | 0 | 0 | 0 | 0 | 30 | 30 | 0 |
| 1 | 0 | 30 | 1 | 1 | 30 | 29.9999+ | 0− |
| 1 | 0 | 30 | 2 | 1 | 30 | | |
| 1 | 0 | 30 | 3 | 1 | 30 | | |
| 1 | 0 | 30 | 4 | 1 | 30 | 29.9996 | −0.004 |
| 1 | 0 | 30 | 5 | 1 | 30 | | |
| 1 | 0 | 30 | 6 | 1 | 30 | | |
| 1 | 0 | 30 | 7 | 1 | 30 | | |
| 1 | 0 | 30 | 8 | 1 | 30 | | |
| 1 | 0 | 30 | 9 | 1 | 30 | | |
| 1 | 0 | 30 | 10 | 1 | 30 | 29.9882 | −0.0118 |
| 1 | 0 | 30 | 11 | 1 | 30 | | |
| 1 | 0 | 30 | 12 | 1 | 30 | | |
| 1 | 0 | 30 | 13 | 1 | 30 | | |
| 1 | 0 | 30 | 14 | 1 | 30 | | |
| 1 | 0 | 30 | 15 | 1 | 30 | | |
| 1 | 0 | 30 | 16 | 1 | 30 | 29.9337 | −0.0883 |
| 1 | 0 | 30 | 17 | 1 | 30 | | |
| 1 | 0 | 30 | 18 | 1 | 30 | | |
| 1 | 0 | 30 | 19 | 1 | 30 | | |
| 1 | 0 | 30 | 20 | 1 | 30 | | |
| 1 | 0 | 30 | 21 | 1 | 30 | | |
| 1 | 0 | 30 | 22 | 1 | 30 | 29.7974 | −0.2026 |
| 1 | 0 | 30 | 23 | 1 | 30 | | |
| 1 | 0 | 30 | 24 | 1 | 30 | | |
| 1 | 0 | 30 | 25 | 1 | 30 | | |
| 1 | 0 | 30 | 26 | 1 | 30 | | |
| 1 | 0 | 30 | 27 | 1 | 30 | | |
| 1 | 0 | 30 | 28 | 1 | 30 | 29.5449 | −0.4551 |
| 1 | 0 | 30 | 29 | 1 | 30 | | |
| 1 | 0 | 30 | 30 | 1 | 30 | | |
| 1 | 0 | 30 | 31 | 1 | 30 | | |
| 1 | 0 | 30 | 32 | 1 | 30 | | |
| 1 | 0 | 30 | 33 | 1 | | | |
| 1 | 0 | 30 | 34 | 1 | 30 | 29.1518 | −0.8482 |

TABLE 4-continued

DECELERATION BEHAVIOUR OF CELL NO. 4

| INPUT | | | | OUTPUT | GENERATED | COMPUTED | ERROR |
|---|---|---|---|---|---|---|---|
| $\Delta C_3$ | E −<br>$\Delta C_4.30$ | E +<br>$\Delta t.S_4$ | $\Sigma \Delta t$ | $\Delta C_4$ | $S_4$ | | COMPUTED<br>$-S_4$ |
| 1 | 0 | 30 | 35 | 1 | 30 | | |
| 1 | 0 | 30 | 36 | 1 | 29 | | |
| 1 | 0 | 29 | 37 | 1 | 29 | 28.898 | −0.102 |
| 1 | −1 | 28 | 38 | 1 | 29 | | |
| 1 | 2 | 27 | 39 | 1 | 29 | | |
| 1 | −3 | 26 | 40 | 1 | 29 | 28.605 | −0.395 |
| 1 | −4 | 25 | 41 | 1 | 29 | | |
| 1 | −5 | 24 | 42 | 1 | 29 | | |
| 0 | −6 | 23 | 43 | 1 | 28 | 28.273 | 0.273 |
| 1 | −7 | 21 | 44 | 1 | 28 | | |
| 1 | −9 | 19 | 45 | 1 | 28 | | |
| 1 | −11 | 17 | 46 | 1 | 28 | 27.903 | −0.097 |
| 1 | −13 | 15 | 47 | 1 | 28 | | |
| 0 | −15 | 13 | 48 | 1 | 27 | | |
| 1 | −17 | 10 | 49 | 1 | 27 | 27.496 | 0.498 |
| 1 | −20 | 7 | 50 | 1 | 27 | | |
| 1 | −23 | 4 | 51 | 1 | 27 | | |
| 0 | −26 | 1 | 52 | 1 | 26 | 27.053 | 1.053 |
| 1 | −29 | −3 | 53 | 0 | 27 | | |
| 1 | | 24 | 54 | 1 | 27 | | |
| 1 | −6 | 21 | 55 | 1 | 27 | 26.576 | −0.424 |
| 0 | −9 | 18 | 56 | 1 | 26 | | |
| 1 | −12 | 14 | 57 | 1 | 26 | | |
| 1 | −16 | 10 | 58 | 1 | 26 | 26.068 | 0.068 |
| 1 | −20 | 6 | 59 | 1 | 26 | | |
| 0 | −24 | 2 | 60 | 1 | 25 | | |
| 1 | −28 | −3 | 61 | 0 | 26 | 25.532 | −0.468 |
| 1 | | 23 | 62 | 1 | 26 | | |
| 0 | −7 | 19 | 63 | 1 | 25 | | |
| 1 | −11 | 14 | 64 | 1 | 25 | 24.969 | −0.031 |
| 0 | −16 | 9 | 65 | 1 | 24 | | |
| 1 | −21 | 3 | 66 | 1 | 24 | | |
| 1 | −27 | −3 | 67 | 0 | 25 | 24.383 | −0.617 |
| 0 | | 22 | 68 | 1 | 24 | | |
| 1 | −8 | 16 | 69 | 1 | 24 | | |
| 0 | −14 | 10 | 70 | 1 | 23 | 23.776 | 0.776 |
| 1 | −20 | 3 | 71 | 1 | 23 | | |
| 1 | −27 | −4 | 72 | 0 | 24 | | |
| 0 | | 20 | 73 | 1 | 23 | 23.152 | 0.152 |
| 1 | −1 | 13 | 74 | 1 | 23 | | |
| 0 | −17 | 6 | 75 | 1 | 22 | | |
| 1 | −24 | −2 | 76 | 0 | 123 | 22.513 | 0.487 |
| 0 | | 21 | 77 | 1 | 22 | | |
| 1 | −9 | 13 | 78 | 1 | 22 | | |
| 0 | −17 | 5 | 79 | 1 | 21 | 21.862 | 0.862 |
| 1 | −25 | −4 | 80 | 0 | 22 | | |
| 0 | | 18 | 81 | 1 | 21 | | |
| 1 | −12 | 9 | 82 | 1 | 21 | 21.202 | 0.202 |
| 0 | −21 | 0 | 83 | 0 | 21 | | |
| 1 | | 21 | 84 | 1 | 21 | | |
| 0 | −9 | 12 | 85 | 1 | 20 | 20.536 | 0.535 |
| 1 | −18 | 2 | 86 | 1 | 20 | | |
| 0 | −28 | −8 | 87 | 0 | 20 | | |
| 1 | | 12 | 88 | 1 | 20 | 19.865 | −0.135 |
| 0 | −18 | 2 | 89 | 1 | 19 | | |
| 0 | −28 | −9 | 90 | 0 | 19 | | |
| 1 | | 10 | 91 | 1 | 19 | 19.193 | 0.193 |
| 0 | −20 | −1 | 92 | 0 | 19 | | |
| 1 | | 18 | 93 | 1 | 19 | | |
| 0 | −12 | 7 | 94 | 1 | 18 | 18.522 | 0.522 |
| 0 | −23 | −5 | 95 | 0 | 18 | | |
| 1 | | 13 | 96 | 1 | 18 | | |
| 0 | −17 | 1 | 97 | 1 | 17 | 17.853 | 0.853 |
| 1 | −29 | −12 | 98 | 0 | 18 | | |
| 0 | | 6 | 99 | 1 | 17 | | |
| 0 | −24 | −7 | 100 | 0 | 17 | 17.190 | 0.190 |
| 1 | | 10 | 101 | 1 | 17 | | |
| 0 | −20 | −3 | 102 | 0 | 17 | | |
| 0 | | 14 | 103 | 1 | 16 | | |

TABLE 5

POSITION AS A FUNCTION OF TIME OF THE OUTPUT OF CELL 4 DURING DECELERATION

| TIME PERIOD | OUTPUT INCREMENTS | GENERATED DISTANCE | COMPUTED DISTANCE | ERROR |
|---|---|---|---|---|
| $\Sigma \Delta t$ | $\Delta C_4$ | $\Sigma \Delta C_4$ | | |
| 0 | 0 | 0 | 0 | 0 |
| 1 | 1 | 1 | 0.9999+ | 0 |
| 2 | 1 | 2 | 1.9999+ | 0 |
| 3 | 1 | 3 | | |
| 4 | 1 | 4 | | |
| 5 | 1 | 5 | | |
| 6 | 1 | 6 | | |

TABLE 5-continued

POSITION AS A FUNCTION OF TIME OF THE OUTPUT OF CELL 4 DURING DECELERATION

| TIME PERIOD | OUTPUT INCREMENTS | GENERATED DISTANCE | COMPUTED DISTANCE | ERROR |
|---|---|---|---|---|
| $\Sigma \Delta t$ | $\Delta C_4$ | $\Sigma \Delta C_4$ | | |
| 7 | 1 | 7 | 6.9998 | −0.0002 |
| 8 | 1 | 8 | | |
| 9 | 1 | 9 | | |
| 10 | 1 | 10 | | |
| 11 | 1 | 11 | | |
| 12 | 1 | 12 | 11.9980 | −0.0020 |
| 13 | 1 | 13 | | |
| 14 | 1 | 14 | | |
| 15 | 1 | 15 | | |
| 16 | 1 | 16 | | |
| 17 | 1 | 17 | 16.9899 | −0.0101 |
| 18 | 1 | 18 | | |
| 19 | 1 | 19 | | |
| 20 | 1 | 20 | | |
| 21 | 1 | 21 | 21.9672 | 0.0328 |
| 22 | 1 | 22 | | |
| 23 | 1 | 23 | | |
| 24 | 1 | 24 | | |
| 25 | 1 | 25 | | |
| 26 | 1 | 26 | | |
| 27 | 1 | 27 | 26.9179 | −0.0821 |
| 28 | 1 | 28 | | |
| 29 | 1 | 29 | | |
| 30 | 1 | 30 | | |
| 31 | 1 | 31 | | |
| 32 | 1 | 32 | 31.8273 | −0.1727 |
| 33 | 1 | 33 | | |
| 34 | 1 | 34 | | |
| 35 | 1 | 35 | | |
| 36 | 1 | 36 | | |
| 37 | 1 | 37 | 36.6786 | −0.3214 |
| 38 | 1 | 38 | | |
| 39 | 1 | 39 | | |
| 40 | 1 | 40 | | |
| 41 | 1 | 41 | | |
| 42 | 1 | 42 | 41.4539 | −0.5461 |
| 43 | 1 | 43 | | |
| 44 | 1 | 44 | | |
| 45 | 1 | 45 | | |
| 46 | 1 | 46 | | |
| 47 | 1 | 47 | 46.1354 | −0.8646 |
| 48 | 1 | 48 | | |
| 49 | 1 | 49 | | |
| 50 | 1 | 50 | | |
| 51 | 1 | 51 | | |
| 52 | 1 | 52 | | |
| 53 | 0 | | | |
| 54 | 1 | 53 | | |
| 55 | 1 | 54 | | |
| 56 | 1 | 55 | | |
| 57 | 1 | 56 | 55.148 | −0.852 |
| 58 | 1 | 57 | | |
| 59 | 1 | 58 | | |
| 60 | 1 | 59 | | |
| 61 | 0 | | | |
| 62 | 1 | 60 | 59.448 | −0.552 |
| 63 | 1 | 61 | | |
| 64 | 1 | 62 | | |
| 65 | 1 | 63 | | |
| 66 | 1 | 64 | | |
| 67 | 0 | | 63.572 | −0.428 |
| 68 | 1 | 65 | | |
| 69 | 1 | 66 | | |
| 70 | 1 | 67 | | |
| 71 | 1 | 68 | | |
| 72 | 0 | | 67.572 | −0.428 |
| 73 | 1 | 69 | | |
| 74 | 1 | 70 | | |
| 75 | 1 | 71 | | |
| 76 | 0 | | | |
| 77 | 1 | 72 | 71.378 | −0.622 |
| 78 | 1 | 73 | | |
| 79 | 1 | 74 | | |
| 80 | 0 | | | |
| 81 | 1 | 75 | | |
| 82 | 1 | 76 | 75.003 | −0.997 |
| 83 | 0 | | | |
| 84 | 1 | 77 | | |
| 85 | 1 | 78 | | |
| 86 | 1 | 79 | | |
| 87 | 0 | | 78.444 | −0.556 |
| 88 | 1 | 80 | | |

TABLE 5-continued

POSITION AS A FUNCTION OF TIME OF THE OUTPUT OF CELL 4 DURING DECELERATION

| TIME PERIOD $\Sigma \Delta t$ | OUTPUT INCREMENTS $\Delta C_4$ | GENERATED DISTANCE $\Sigma \Delta C_4$ | COMPUTED DISTANCE | ERROR |
|---|---|---|---|---|
| 89 | 1 | 81 | | |
| 90 | 0 | | | |
| 91 | 1 | 82 | | |
| 92 | 0 | | 81.699 | −0.301 |
| 93 | 1 | 83 | | |
| 94 | 1 | 84 | | |
| 95 | 0 | | | |
| 96 | 1 | 85 | | |
| 97 | 1 | 86 | 84.767 | −1.233 |
| 98 | 0 | | | |
| 99 | 1 | 87 | | |
| 100 | 0 | | 86.519 | −0.481 |
| 101 | | | | |

TABLE 6

ACCELERATION BEHAVIOR - CELL NO. 1

| $-\frac{E}{\tau}(\Delta C) 30$ | $+\frac{E}{\tau}(\Delta t)S$ | $\Sigma \Delta t^{(1)}$ | OUTPUT $\Delta C$ | GENERATED $S$ | COMPUTED $30(1-\epsilon^{-\frac{\Sigma \Delta t}{30}})$ | ERROR COMPUTED $-S$ |
|---|---|---|---|---|---|---|
| 0 | 0 | 0 | 0 | 0 | 0 | 0 |
| 0 | 0 | 1 | 0 | 1 | 0.984 | −0.016 |
| 0 | 1 | 2 | 1 | 1 | 1.935 | 0.935 |
| −29 | −28 | 3 | 0 | 2 | 2.855 | 0.855 |
| | −26 | 4 | 0 | 3 | 3.745 | 0.745 |
| | −23 | 5 | 0 | 4 | 4.606 | 0.606 |
| | −19 | 6 | 0 | 5 | 5.438 | 0.438 |
| | −14 | 7 | 0 | 6 | 6.243 | 0.243 |
| | −8 | 8 | 0 | 7 | 7.022 | 0.022 |
| | −1 | 9 | 0 | 8 | 7.775 | −0.225 |
| | 7 | 10 | 1 | 8 | 8.504 | 0.504 |
| −23 | −15 | 11 | 0 | 9 | 9.209 | 0.209 |
| | −6 | 12 | 0 | 10 | 9.980 | −0.110 |
| | 4 | 13 | 1 | 10 | 10.550 | 0.550 |
| −26 | −16 | 14 | 0 | 11 | 11.187 | 0.187 |
| | −5 | 15 | 0 | 12 | 11.804 | −0.196 |
| | 7 | 16 | 1 | 12 | 12.401 | 0.401 |
| −23 | −11 | 17 | 0 | 13 | 12.978 | −0.022 |
| | 2 | 18 | 1 | 13 | 13.536 | 0.536 |
| −28 | −15 | 19 | 0 | 14 | 14.075 | 0.075 |
| | −1 | 20 | 0 | 15 | 14.597 | −0.403 |
| | 14 | 21 | 1 | 15 | 15.102 | 0.102 |
| −16 | −1 | 22 | 0 | 16 | 15.591 | −0.409 |
| | 15 | 23 | 1 | 16 | 16.063 | 0.063 |
| −15 | 1 | 24 | 1 | 16 | 16.520 | 0.520 |
| −29 | −13 | 25 | 0 | 17 | 16.962 | −0.038 |
| | 4 | 26 | 1 | 17 | 17.389 | 0.389 |
| −26 | −9 | 27 | 0 | 18 | 17.803 | −0.197 |
| | 9 | 28 | 1 | 18 | 18.203 | 0.203 |
| −21 | −3 | 29 | 0 | 19 | 18.590 | −0.410 |
| | 16 | 30 | 1 | 19 | 18.964 | −0.036 |
| −14 | 5 | 31 | 1 | 19 | 19.325 | 0.325 |
| −25 | −6 | 32 | 0 | 20 | 19.675 | −0.325 |
| | 14 | 33 | 1 | 20 | 20.014 | 0.014 |
| −16 | 4 | 34 | 1 | 20 | 20.341 | 0.341 |
| −26 | −6 | 35 | 0 | 21 | 20.658 | −0.342 |
| | 15 | 36 | 1 | 21 | 20.964 | <0.036 |
| −15 | 6 | 37 | 1 | 21 | 21.260 | 0.260 |
| −24 | −3 | 38 | 0 | 22 | 21.547 | −0.453 |
| | 19 | 39 | 1 | 22 | 21.824 | −0.176 |
| −11 | 11 | 40 | 1 | 22 | 22.092 | 0.092 |
| −19 | 3 | 41 | 1 | 22 | 22.351 | 0.351 |
| −27 | −5 | 42 | 0 | 23 | 22.602 | −0.398 |
| | 18 | 43 | 1 | 23 | 22.845 | −0.155 |
| −12 | 11 | 44 | 1 | 23 | 23.079 | 0.079 |
| −19 | 4 | 45 | 1 | 23 | 23.306 | 0.306 |
| −26 | −3 | 46 | 0 | 24 | 23.526 | −0.474 |
| | 21 | 47 | 1 | 24 | 23.738 | −0.262 |
| −9 | 15 | 48 | 1 | 24 | 23.943 | −0.057 |
| −15 | 9 | 49 | 1 | 24 | 24.142 | 0.142 |
| −21 | 3 | 50 | 1 | 24 | 24.333 | 0.333 |
| −27 | −3 | 51 | 0 | 25 | 24.519 | −0.481 |
| | 22 | 52 | 1 | 25 | 24.699 | −0.301 |
| −8 | 17 | 53 | 1 | 25 | 24.873 | −0.127 |
| −13 | 12 | 54 | 1 | 25 | 25.041 | 0.041 |
| −18 | 7 | 55 | 1 | 25 | 25.204 | 0.204 |
| −23 | 2 | 56 | 1 | 25 | 25.361 | 0.361 |
| −28 | −3 | 57 | 0 | 26 | 25.513 | −0.487 |
| | 23 | 58 | 1 | 26 | 25.660 | −0.340 |
| −7 | 19 | 59 | 1 | 26 | 25.802 | −0.198 |
| −11 | 15 | 60 | 1 | 26 | 25.940 | −0.060 |
| −15 | 11 | 61 | 1 | 26 | 26.073 | 0.073 |
| −19 | 7 | 62 | 1 | 26 | 26.202 | 0.202 |

TABLE 6 -continued

ACCELERATION BEHAVIOR - CELL NO. 1

| | | | OUTPUT | GENERATED | COMPUTED | ERROR |
|---|---|---|---|---|---|---|
| $-\frac{E}{r}(\Delta C)\,30$ | $+\frac{E}{r}(\Delta t)S$ | $\Sigma \Delta t^{(1)}$ | $\Delta C$ | $S$ | $30(1-\epsilon^{\frac{\Sigma \Delta t}{30}})$ | COMPUTED $-S$ |
| −23 | 3 | 63 | 1 | 26 | 26.326 | 0.326 |
| −27 | −1 | 64 | 0 | 27 | 26.447 | −0.553 |
|  | 26 | 65 | 1 | 27 | 26.563 | −0.437 |
| −4 | 23 | 66 | 1 | 27 | 26.676 | −0.324 |
| −7 | 20 | 67 | 1 | 27 | 26.785 | −0.215 |
| −10 | 17 | 68 | 1 | 27 | 26.890 | −0.110 |

$^{(1)}$ $\Delta C_{IN}$ is assumed to be present at every $\Delta t$

TABLE 7

ACCELERATION BEHAVIOUR - CELL NO. 2

| INPUT | | | | OUTPUT | GENERATED | COMPUTED | ERROR |
|---|---|---|---|---|---|---|---|
| $\Delta C_1$ | $\frac{E-}{r}\Delta C_2.30$ | $\frac{E+}{r}\Delta t.S_2$ | $\Sigma\Delta t$ | $\Delta C_2$ | $S_2$ | | COMPUTED $-S_2$ |
| 0 | 0 | 0 | 0 | 0 | 0 | 0 | |
| 0 | 0 | 0 | 1 | 0 | | 0.016 | 0.016 |
| 1 | 0 | 0 | 2 | 0 | 1 | 0.064 | −0.936 |
| 0 | 0 | 1 | 3 | 1 | 0 | 0.140 | 0.140 |
| 0 | −30 | −30 | 4 | 0 | | 0.244 | 0.244 |
| 0 | | −30 | 5 | 0 | | 0.373 | 0.373 |
| 0 | | −30 | 6 | 0 | | 0.526 | 0.526 |
| 0 | | −30 | 7 | 0 | | 0.700 | 0.700 |
| 0 | | −30 | 8 | 0 | | 0.895 | 0.895 |
| 0 | | −30 | 9 | 0 | | 1.108 | 1.108 |
| 1 | | −30 | 10 | 0 | 1 | 1.339 | 0.339 |
| 0 | 0 | −29 | 11 | 0 | | 1.585 | 0.585 |
| 0 | | −28 | 12 | 0 | | 1.847 | 0.847 |
| 1 | | −27 | 13 | 0 | 2 | 2.121 | 0.121 |
| 0 | | −25 | 14 | 0 | | 2.408 | 0.408 |
| 0 | | −23 | 15 | 0 | | 2.706 | 0.706 |
| 1 | | −21 | 16 | 0 | 3 | 3.014 | 0.014 |
| 0 | | −18 | 17 | 0 | | 3.332 | 0.332 |
| 1 | | −15 | 18 | 0 | 4 | 3.657 | −0.343 |
| 0 | | −11 | 19 | 0 | | 3.990 | −0.010 |
| 0 | | −7 | 20 | 0 | | 4.329 | 0.329 |
| 1 | | −3 | 21 | 0 | 5 | 4.674 | −.0326 |
| 0 | | 2 | 22 | 1 | 4 | 5.024 | 1.024 |
| 1 | −28 | −24 | 23 | 0 | 5 | 5.378 | 0.378 |
| 1 | | −19 | 24 | 0 | 6 | 5.736 | −0.264 |
| 0 | | −13 | 25 | 0 | | 6.097 | 0.097 |
| 1 | | −7 | 26 | 0 | 7 | 6.460 | −0.540 |
| 0 | | 0 | 27 | 0 | | 6.826 | −0.174 |
| 1 | | 7 | 28 | 1 | 7 | 7.192 | 0.192 |
| 0 | −23 | −16 | 29 | 0 | | 7.559 | 0.559 |
| 1 | | −9 | 30 | 0 | 8 | 7.927 | −0.073 |
| 1 | | −1 | 31 | 0 | 9 | 8.295 | −0.705 |
| 0 | | 8 | 32 | 1 | 8 | 8.662 | 0.662 |
| 1 | −11 | −14 | 33 | 0 | 9 | 9.029 | 0.029 |
| 1 | | −5 | 34 | 0 | 10 | 9.395 | −0.605 |
| 0 | | 5 | 35 | 1 | 9 | 9.759 | 0.759 |
| 1 | −25 | −16 | 36 | 0 | 10 | 10.121 | 0.121 |
| 1 | | −6 | 37 | 0 | 11 | 10.482 | −0.518 |
| 0 | | 5 | 38 | 1 | 10 | 10.840 | 0.840 |
| 1 | −25 | −15 | 39 | 0 | 11 | 11.195 | 0.195 |
| 1 | | −5 | 40 | 0 | 12 | 11.548 | −0.452 |
| 1 | | 7 | 41 | 1 | 12 | 11.898 | −0.102 |
| 0 | −23 | −11 | 42 | 0 | | 12.245 | 0.245 |
| 1 | | 1 | 43 | 1 | 12 | 12.589 | 0.589 |
| 1 | −29 | −17 | 44 | 0 | 13 | 12.929 | −0.071 |
| 1 | | −4 | 45 | 0 | 14 | 13.265 | −0.735 |
| 0 | | 10 | 46 | 1 | 13 | 13.598 | 0.598 |
| 1 | −20 | −7 | 47 | 0 | 14 | 13.927 | −0.073 |
| 1 | | 7 | 48 | 1 | 14 | 14.252 | 0.252 |
| 1 | −23 | −9 | 49 | 0 | 15 | 14.573 | −0.427 |
| 1 | | 6 | 50 | 1 | 15 | 14.890 | −0.110 |
| 0 | −24 | −9 | 51 | 0 | | 15.203 | 0.203 |
| 1 | | 6 | 52 | 1 | 15 | 15.511 | 0.511 |
| 1 | −24 | −9 | 53 | 0 | 16 | 15.815 | −0.185 |
| 1 | | 7 | 54 | 1 | 16 | 16.115 | 0.115 |
| 1 | −23 | −7 | 55 | 0 | 17 | 16.410 | −0.590 |
| 1 | | 10 | 56 | 1 | 17 | 16.701 | −0.299 |
| 0 | −20 | −3 | 57 | 0 | | 16.988 | −0.012 |
| 1 | | 14 | 58 | 1 | 17 | 17.269 | 0.269 |
| 1 | −16 | 1 | 59 | 1 | 17 | 17.547 | 0.547 |
| 1 | −29 | −12 | 60 | 0 | 18 | 17.820 | −0.180 |
| 1 | | 6 | 61 | 1 | 18 | 18.088 | 0.088 |
| 1 | −24 | −6 | 62 | 0 | 19 | 18.352 | −0.648 |
| 1 | | 13 | 63 | 1 | 19 | 18.612 | −0.388 |
| 0 | −17 | 2 | 64 | 1 | 18 | 18.866 | 0.866 |
| 1 | −28 | −10 | 65 | 0 | 19 | 19.117 | 0.117 |
| 1 | | 9 | 66 | 1 | 19 | 19.363 | 0.363 |

TABLE 7-continued

| INPUT | | | | OUTPUT | ACCELERATION BEHAVIOUR - CELL NO. 2 GENERATED | COMPUTED | ERROR |
|---|---|---|---|---|---|---|---|
| $\Delta C_1$ | E−<br>$\Delta C_2.30$ | E+<br>$\Delta t.S_2$ | $\Sigma\Delta t$ | $\Delta C_2$ | $S_2$ | | COMPUTED<br>$-S_2$ |
| 1 | −21 | −2 | 67 | 0 | 20 | 19.604 | −0.396 |

TABLE 8

POSITION AS A FUNCTION OF TIME OF THE OUTPUT CELL NO. 2 DURING ACCELERATION

| TIME PERIOD | OUTPUT INCREMENTS | GENERATED DISTANCE | COMPUTED DISTANCE | ERROR |
|---|---|---|---|---|
| $\Sigma\Delta t$ | $\Delta C_2$ | $\Sigma\Delta C_2$ | | |
| 0 | 0 | 0 | 0 | 0 |
| 1 | 0 | | 0.0002 | 0.0002 |
| 2 | 0 | | 0.0014 | 0.0014 |
| 3 | 1 | 1 | 0.0048 | −0.9952 |
| 4 | 0 | | 0.0111 | −0.9889 |
| 5 | 0 | | 0.0213 | −0.9787 |
| 6 | 0 | | | |
| 7 | 0 | | | |
| 8 | 0 | | | |
| 9 | 0 | | | |
| 10 | 0 | | | |
| 11 | 0 | | 0.2059 | −0.7941 |
| 12 | 0 | | | |
| 13 | 0 | | | |
| 14 | 0 | | | |
| 15 | 0 | | | |
| 16 | 0 | | | |
| 17 | 0 | | 0.6909 | −0.3091 |
| 18 | 0 | | | |
| 19 | 0 | | | |
| 20 | 0 | | | |
| 21 | 0 | | | |
| 22 | 1 | 2 | | |
| 23 | 0 | | 1.5584 | −0.4416 |
| 24 | 0 | | | |
| 25 | 0 | | | |
| 26 | 0 | | | |
| 27 | 0 | | | |
| 28 | 1 | 3 | | |
| 29 | 0 | | 2.8510 | −0.1490 |
| 30 | 0 | | | |
| 31 | 0 | | | |
| 32 | 1 | 4 | | |
| 33 | 0 | | | |
| 34 | 0 | | | |
| 35 | 1 | 5 | 4.5833 | −0.4167 |
| 36 | 0 | | | |
| 37 | 0 | | | |
| 38 | 1 | 6 | 5.6134 | −0.3866 |
| 39 | 0 | | | |
| 40 | 0 | | | |
| 41 | 1 | 7 | 6.7505 | −0.2495 |
| 42 | 0 | | | |
| 43 | 1 | 8 | | |
| 44 | 0 | | 7.9921 | −0.0079 |
| 45 | 0 | | | |
| 46 | 1 | 9 | | |
| 47 | 0 | | 9.3352 | 0.3352 |
| 48 | 1 | 10 | | |
| 49 | 0 | | | |
| 50 | 1 | 11 | 10.7763 | −0.2237 |
| 51 | 0 | | | |
| 52 | 1 | 12 | | |
| 53 | 0 | | 12.3119 | 0.3119 |
| 54 | 1 | 13 | | |
| 55 | 0 | | | |
| 56 | 1 | 14 | 13.9380 | −0.0620 |
| 57 | 0 | | | |
| 58 | 1 | 15 | | |
| 59 | 1 | 16 | 15.6508 | −0.3492 |
| 60 | 0 | | | |
| 61 | 1 | 17 | | |
| 62 | 0 | | 17.4461 | 0.4461 |
| 63 | 1 | 18 | | |
| 64 | 1 | 19 | | |
| 65 | 0 | | 19.3199 | 0.3199 |
| 66 | 1 | 20 | | |
| 67 | 0 | | | |
| 68 | 1 | 21 | 21.2681 | 0.2681 |

What is claimed is:

1. Apparatus for moving a movable member in accordance with a programmed path and velocity, enabling the programming of rapid velocity changes, during both acceleration and deceleration, with reduced path errors, comprising: first digital generating means generating a series of program electrical pulses representing a first trace corresponding to the programmed path and velocity of movement of the movable member; second digital generating means generating, from said program electrical pulses, a series of command electrical pulses representing a second trace corresponding to the programmed path and velocity of the first trace but lagging same by a lag which varies with variations in the programmed path velocity during both acceleration and deceleration; and drive control means controlling the movement of the movable member in accordance with said series of command electrical pulses.

2. Apparatus as defined in claim 1, wherein there are a plurality of axes of movement of the movable member, and wherein the pulses generated by both said digital generating means comprise program and command, respectively, axis-pulses for each axis of movement of the movable member, each axis-pulse representing a small fixed increment of movement of the movable member for the respective axis, the rate of generation of the axis-pulses for each axis, and the co-ordination of the axis-pulses between the different axes, representing the resultant path and velocity of movement of the movable member.

3. Apparatus as defined in claim 2, wherein said second digital generating means comprises a lag storage system for each axis receiving the program axis-pulses of the respective axis and storing a value corresponding to the programmed movement velocity thereof, said lag storage system including digital means effective upon an increase or decrease in the programmed movement velocity for effecting a corresponding increase or decrease, but at a slower rate, of the value stored in said lag storage means and for producing said command axis-pulses in accordance therewith.

4. Apparatus as defined in claim 3, wherein said lag storage system comprises, for each axis, a data register accumulating the program axis-pulses for the respective axis, an error register, first incrementing means periodically incrementing the error register in one direction by the amount in the data register and producing a command axis-pulse each such time the error register is of one sign, second incrementing means effective upon the generation of each command axis-pulse to increment the error register in the opposite direction by a predetermined quantity corresponding to desired acceleration and deceleration characteristics of the system, a change in the sign in the error register terminating the generation of the command axis-pulses until a subsequent incrementing thereof by the amount in the data register changes it back to said one sign, said command axis-pulses being utilized by the drive control means for controlling the movement of said movable member.

5. Apparatus as defined in claim 4, further including third incrementing means for incrementing the data register one unit in the said opposite direction upon the generation of each command axis-pulse.

6. Apparatus as defined in claim 4, wherein said lag storage system for each axis is divided into a plurality of stages each corresponding to a predetermined fraction of the lag between the program axis-pulses and the command axis-pulses for each axis, each of said stages including a data register and an error register for the respective lag fraction, the command axis-pulses outputted from each stage being inputted into the succeeding stage, and the command axis-pulses outputted from the last stage being utilized for controlling the movement of the movable member.

7. Apparatus as defined in claim 4, wherein said predetermined quantity of the second incrementing means is equal to a fixed constant defining the velocity-change characteristics of the system divided by the number of stages in said lag storage system.

8. Apparatus as defined in claim 4, wherein said first incrementing means adds into the error register the amount in the data register and produces a command axis-pulse each time the error register is positive, and said second incrementing means is effective upon the generation of each command axis-pulse to subtract from the error register said predetermined quantity corresponding to the desired acceleration and deceleration characteristics of the system, the generation of the command axis-pulses being terminated whenever the error register becomes zero or negative, until a subsequent incrementing thereof by the amount in the data register makes it positive again.

9. Apparatus as defined in claim 8, wherein each generation of a command axis-pulse also subtracts one unit from the respective data register.

10. Apparatus for generating, from a series of input program axis-pulses corresponding to a programmed path and velocity of movement, a series of output command axis-pulses to be supplied to the drive control means to trace a resultant movement of a member in accordance with the programmed path and velocity, comprising: a lag storage system receiving said program axis-pulses and storing a value corresponding to the programmed-movement velocity thereof, said lag storage system including means effective upon an increase or decrease in the programmed movement velocity for effecting a corresponding increase or decrease, but at a slower rate, of the said value stored in said lag storage means and for producing command axis-pulses in accordance therewith, and means for feeding the command axis-pulses to the drive control means.

11. Apparatus as defined in claim 10, wherein said lag storage means comprises a data register accumulating the program axis-pulses, an error register, first incrementing means periodically incrementing the error register in one direction by the amount in the data register and producing a command axis-pulse each such time the error register is of one sign, and second incrementing means effective upon the generation of each command axis-pulse to increment the error register in the opposite direction by a predetermined quantity corresponding to desired acceleration and deceleration characteristics of the system, a change in the sign in the error register terminating the generation of the command axis-pulses until a subsequent incrementing thereof by the amount in the data register changes it back to said one sign, said command axis-pulses being utilized by the drive control means for controlling the movement of said movable member.

12. Apparatus as defined in claim 11, wherein said lag storage system is divided into a plurality of stages each corresponding to a predetermined fraction of the lag between the program axis-pulses and the command axis-pulses, each of said stages including a data register and an error register for the respective lag fraction, the command axis-pulses outputted from each stage being inputted into the succeeding stage, and the command axis-pulses outputted from the last stage being utilized for controlling the movement of the movable member.

13. Apparatus as defined in claim 12, wherein said first incrementing means adds into the error register the amount in the data register and produces a command axis-pulse each time the error register is positive, and said second incrementing means is effective upon the generation of each command axis-pulse to subtract from the error register said predetermined quantity corresponding to the desired acceleration and deceleration characteristics of the system, the generation of the command axis-pulses being terminated whenever the error register becomes zero or negative, until a subsequent incrementing thereof by the amount in the data register makes it positive again.

14. Apparatus as defined in claim 13, wherein each generation of a command axis-pulse also subtracts one unit from the respective data register.

15. Apparatus as defined in claim 13, wherein said drive control means includes at least two drives having mutually orthogonal axes of motion, and wherein means including a lag storage system are provided for producing command axis-pulses for each axis drive.

16. Apparatus for generating, from a series of program pulses corresponding to a programmed path and velocity of movement, a series of command axis-pulses to be supplied to the drive control means to trace a resultant movement of a member in accordance with the programmed path and velocity, and in accordance with specified acceleration and deceleration characteristics, comprising: a lag storage system including a data register accumulating the program axis-pulses, an error register, first incrementing means periodically incrementing the error register in one direction by the amount in the data register and producing a command axis-pulse each such time the error register is of one sign, and second incrementing means effective upon the generation of each command axis-pulse to increment the error register in the opposite direction by a predetermined quantity corresponding to the specified acceleration and deceleration characteristics, a change in the sign in the error register terminating the generation of the command axis-pulses until a subsequent incrementing thereof by the amount in the data register changes it back to said one sign, said command axis-pulses being utilized by the drive control means for controlling the movement of said movable member.

17. Apparatus as defined in claim 16, wherein said lag storage system is divided into a plurality of stages each corresponding to a predetermined fraction of the lag between the program axis-pulses and the command axis-pulses, each of said stages including a data register and an error register for the respective lag fraction, the command axis-pulses outputted from each stage being inputted into the succeeding stage, and the command axis-pulses outputted from the last stage being utilized for controlling the movement of the movable member.

18. The method of moving a movable member according to a commanded path and velocity enabling rapid changes in commanded direction, during both acceleration and deceleration, with reduced path errors, comprising the steps of: generating a first series of digital electrical pulses to represent a first trace corresponding to the programmed path and velocity of movement of the movable member; generating, from said first series of digital electrical pulses, a second series of digital electrical pulses to represent a second trace corresponding to the path and velocity of the first trace but lagging same by a lag which varies with the programmed movement velocity, said lag being divided into a plurality of stages each corresponding to a predetermined fraction of the lag, the output of each stage being inputted into the succeeding stage; and controlling the movement of the movable member in accordance with the output of the last lag stage.

19. The method as defined in claim 18, wherein the movable member is moved along a plurality of mutually orthogonal axes of motion, and wherein said first and second electrical signals each comprise a series of axis-pulses for each axis of movement of the movable member, each axis-pulse representing a small fixed increment of movement of the movable member for the respective axis, the rate of generation of the axis-pulses for each axis, and the co-ordination of the axis-pulses between the different axes, representing the resultant path and velocity of movement of the movable member.

* * * * *